US012277803B2

(12) United States Patent
Hartman et al.

(10) Patent No.: US 12,277,803 B2
(45) Date of Patent: Apr. 15, 2025

(54) THERMAL BASED PRESENTATION ATTACK DETECTION FOR BIOMETRIC SYSTEMS

(71) Applicant: ASSA ABLOY Global Solutions AB, Stockholm (SE)

(72) Inventors: Keith W. Hartman, Redwood City, CA (US); Dan Potter, Monterey, CA (US)

(73) Assignee: ASSA ABLOY Global Solutions AB, Stockholm (SE)

( * ) Notice: Subject to any disclaimer, the term of this patent is extended or adjusted under 35 U.S.C. 154(b) by 381 days.

(21) Appl. No.: 17/722,440

(22) Filed: Apr. 18, 2022

(65) Prior Publication Data

US 2022/0343690 A1 Oct. 27, 2022

Related U.S. Application Data

(60) Provisional application No. 63/177,714, filed on Apr. 21, 2021.

(51) Int. Cl.
*G06V 40/40* (2022.01)
*G06V 40/16* (2022.01)
*G07C 9/00* (2020.01)

(52) U.S. Cl.
CPC ............ *G06V 40/45* (2022.01); *G06V 40/166* (2022.01); *G06V 40/171* (2022.01); *G07C 9/00563* (2013.01)

(58) Field of Classification Search
CPC .... G06V 40/45; G06V 40/166; G06V 40/171; G06V 10/143; G06V 40/103; G06V 40/40; G06V 40/16; G07C 9/00563; G07C 9/37; G07C 9/38

USPC .......................................................... 382/118
See application file for complete search history.

(56) References Cited

U.S. PATENT DOCUMENTS

| | | | | |
|---|---|---|---|---|
| 8,437,513 | B1 * | 5/2013 | Derakhshani | G06V 40/18 382/117 |
| 8,977,013 | B2 * | 3/2015 | Maev | A61B 5/1172 600/443 |
| 9,082,011 | B2 * | 7/2015 | Komogortsev | A61B 5/165 |
| 9,794,260 | B2 * | 10/2017 | Loughlin-McHugh | G06V 40/67 |
| 10,817,722 | B1 * | 10/2020 | Raguin | G06V 40/40 |
| 10,820,840 | B2 * | 11/2020 | Hogan | G06V 40/40 |
| 2002/0136435 | A1 * | 9/2002 | Prokoski | G06V 40/45 382/118 |
| 2015/0185081 | A1 | 7/2015 | Sano et al. | |

(Continued)

FOREIGN PATENT DOCUMENTS

| JP | 6725121 B1 | 7/2020 |
|---|---|---|
| WO | 2020173117 A1 | 9/2020 |
| WO | 2022076245 A1 | 4/2022 |

OTHER PUBLICATIONS

International Search Report and Written Opinion of ISA dated Aug. 15, 2022 for PCT/US2022/071764.

*Primary Examiner* — Negussie Worku
(74) *Attorney, Agent, or Firm* — Schwegman Lundberg & Woessner, P.A.

(57) ABSTRACT

A presentation attack detection system includes RGB and thermal imaging cameras for acquiring images of an individual and a processor operable to determine a metric for whether the individual is a real human based on the thermal imaging and RGB image data. Related methods are also described.

28 Claims, 21 Drawing Sheets

(56) References Cited

U.S. PATENT DOCUMENTS

| | | | |
|---|---|---|---|
| 2015/0350620 A1 | 12/2015 | Kuchiki | |
| 2017/0124394 A1* | 5/2017 | Thavalengal | H04N 23/843 |
| 2017/0140221 A1 | 5/2017 | Ollila et al. | |
| 2018/0247146 A1* | 8/2018 | Riddle | G06V 40/18 |
| 2019/0362133 A1 | 11/2019 | Margolin et al. | |
| 2019/0362193 A1 | 11/2019 | Dai | |
| 2020/0074651 A1 | 3/2020 | Zhang et al. | |
| 2020/0342245 A1* | 10/2020 | Lubin | G06V 40/70 |
| 2022/0012968 A1* | 1/2022 | Hartman | G06V 40/20 |
| 2023/0274582 A1* | 8/2023 | Vance | G06V 40/161 |
| | | | 382/116 |
| 2023/0350996 A1* | 11/2023 | O'Connor | G06V 40/172 |
| 2023/0360457 A1* | 11/2023 | Hartman | G07C 9/257 |

* cited by examiner

THERMAL BASED PRESENTATION ATTACK DETECTION FOR BIOMETRIC SYSTEMS

CROSS-REFERENCE TO RELATED APPLICATIONS

This claims priority to provisional patent application No. 63/177,714, filed Apr. 21, 2021, entitled "THERMAL BASED PRESENTATION ATTACK DETECTION FOR BIOMETRIC SYSTEMS."

BACKGROUND OF THE INVENTION

1. Field of the Invention

This invention relates to biometric systems, and particularly, to thermal based presentation attack detection for biometric systems.

2. Description of the Related Art

Conventional biometrically enabled door access products require active participation from the user. The user needs to either place themselves in a certain location in front of the access point, or needs to position a fingertip or hand in a certain region for identification.

These systems, however, have a number of drawbacks. Extra time is required for the user to open an access point. Also users need to alter their more habituated motion for opening doors to accommodate the biometric capture. If the user does not present according to the door specification, the door may not unlock.

Another challenge for existing systems is to recognize presentation attacks. Existing presentation attacks can range from simple 2-D display or printouts of enrolled faces, intermediate methods using 3-D mask morphologies, and advanced methods that mimic both 3-D morphologies and optical properties of subjects.

Although methods to detect presentation attacks exist to various levels of success, they suffer from shortcomings including, for example, using excessive power, being oversized, being overweight, being too expensive and/or being overly complicated.

Accordingly, an improved door access system is desired that can automatically permit entry of an authorized person through the door without the need of a key. An improved door access system is desired that combines the benefits of biometric access, while minimizing the additional participation requirements on the users. Additionally, an improved door access system that can recognize presentation attacks and imposters is desired, and that does not suffer from the shortcoming identified above.

SUMMARY OF THE INVENTION

A presentation attack detection system comprises at least one IR camera, at least one RGB camera; and a computer processor operable to evaluate RGB and far infrared image data from the cameras to determine whether the presented individual is real or fake.

In embodiments, the presentation attack detection system further comprises a thermal calibration source, serving to provide reference blackbody temperature visible in the IR camera field of view, and optionally a color calibration apparatus in the field of view of the RGB camera.

In embodiments, an access control system comprises at least one door; an electro-mechanical device for permitting access through the at least one door; one or more illumination sources; at least one camera in the vicinity of the door; and a computer processor framework attached to the door or, optionally, embedded in the door.

In embodiments, the processor framework is operable to perform several operations including but not limited to: compute a body motion of a subject within the scene based on a sequence of images; determine a level of intent the subject presents to the device based on the body motion of the subject; and activate the device based on the level of intent.

In embodiments, the processors are further operable to determine a level of confidence the subject is a match with an authorized individual based on evaluating biometric information, optionally the face, of the subject and the authorized individual; and to activate the device based on the level of intent and the level of confidence.

In embodiments, the processor is further operable to compute a level of authenticity (rank, score, or other metric) the subject is a real person, and to activate the device based on the level of intent, the level of confidence, and the level of authenticity.

In embodiments, a system uses multi-wavelength indirect time of flight depth and imaging sensors to obtain accurate measurement of directional and wavelength dependent optical properties of 3-D surfaces. The information measured by the disclosed systems allows for high confidence detection of presentation attacks for the biometric systems.

In embodiments, the processor is operable to recognize a real human from a PAD selected from the group consisting of paper, video, make-up, 3D mask where worn over a face or not, 3D model, and prosthetic (e.g., applied or attached).

Methods for permitting access based on the user's intent, face matching, and authenticity are also described.

The description, objects and advantages of embodiments of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein are presentation attack detection (PAD) systems for biometric systems, and particularly, thermal based presentation attack detection systems. Although the invention is generally described with reference to controlling access, the invention is not intended to be so limited except where recited in any appended claims and the PAD systems may be incorporated into a wide range of applications, methods, and hardware including, without limitation, access control, point of sale transactions, physical or logical access, lock (e.g., e-lock), enrollment devices, person validation devices, and biometric identity devices.

Access Control Overview

Figure 1:
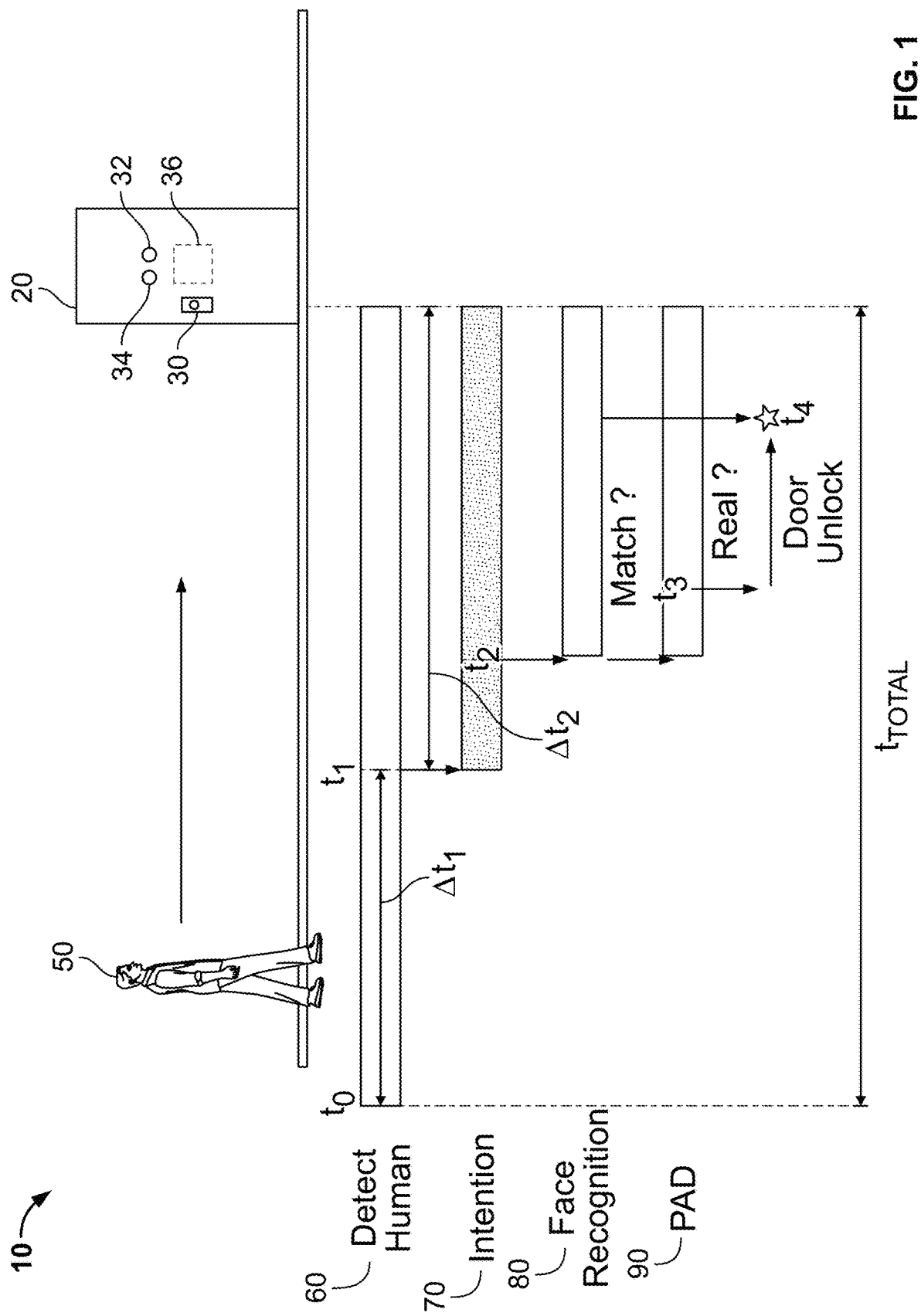
FIG. 1 is an illustration of an access control system for unlocking a door.

FIG. 1 is an illustration of an access control system 10 for unlocking a door 20 as the individual 50 approaches the door in accordance with an embodiment of the invention. The access control system 10 is shown having an electromechanical locking device 30, a camera 32, an illumination device 34, and an onboard or local processor 36. The components are preferably secured on or within the door 20. Padding and shock absorbing materials can be arranged with the components to mitigate any wear and excessive forces arising from repeated door action.

The door access control system shown in FIG. 1 operates according to four phases or stages including detection 60, intention 70, face recognition 80, and presentation attack detection 90.

Initially, the system scans the environment for the presence of a human. If a human is sensed, a time counter commences. The human detection assessment 60, as described further herein, is carried out quickly (e.g., based on as few as 1-2 image frames) and in embodiments is performed in less than a second.

The intention detection phase 70 commences at $t_1$, after confirming human detection. As described further herein, the intention phase 70 computes a rating or score whether the individual is going to reach for the handle to open the door based on a number of factors including body motion. This phase may be performed quickly (e.g., based on 5-30 frames) and in embodiments is performed in less than 2 seconds.

The face recognition phase 80 commences at $t_2$. As described further herein, the face recognition phase 80 computes a rating or score whether the individual's presented biometric information (namely, face embeddings) match with authenticated stored information. This phase may also be performed quickly (e.g., based on 5-30 frames) and in embodiments is performed in less than a second.

The presentation attack detection (PAD) phase 90 commences at $t_3$. As described further herein, the PAD phase 90 computes a rating or score whether the presented biometric information from the individual is real. This phase may also be performed quickly (e.g., based on 5-30 frames) and in embodiments is performed in 0.5 to 5 seconds.

In preferred embodiments, the total time ($t_{total}$) for performing the above described phases can range from 0.5 to 5 seconds, and more preferably 1 to 2 seconds, at which point the computer controller instructs the door to unlock if criteria for each of the assessments is met or within an acceptable range. Additionally, it is to be understood that although the intention 70, face recognition 80, and presentation attack detection 90 phases are shown commencing in sequence at $t_1$, $t_2$, and $t_3$, the invention is not so limited. The different phases may be performed in parallel or in any logical order where such steps are not exclusive of one another.

Figure 2:
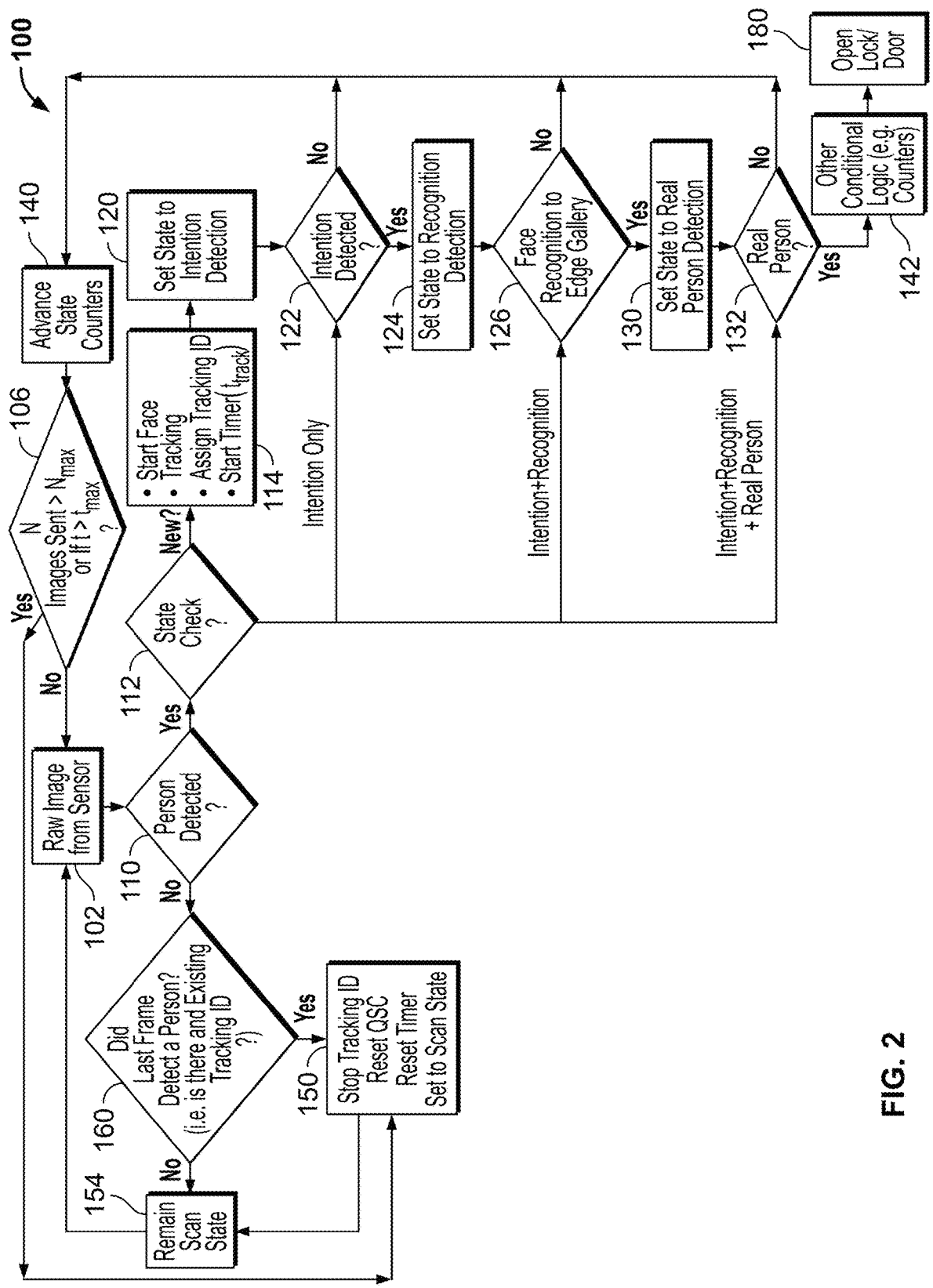
FIG. 2 is a flow chart of a door access control process in accordance with an embodiment of the invention.

With reference to FIG. 2, an access control process 100 is illustrated for opening or unlocking a door such as the door 20 shown in FIG. 1. To facilitate understanding of the process 100, and the performance of exemplary steps of the process, reference is also made to the components and functionality shown in the system block diagram 200 shown in FIG. 3.

Step 102 states to obtain raw images from a sensor. In a preferred embodiment, one or more cameras and sensors 204 are positioned in the operative area to obtain unobstructed images. Examples of cameras, include without limitation, Leopard Imaging CMOS camera, model number LI-USB30-AR023ZWDRB (Freemont, California). The computer (or on-board image signal processor) may also control or automate exposure settings to optimize the amount of light exposed to the camera sensor. Examples of sensors include, without limitation, the IMX501 image sensor manufactured by Sony Corporation (Tokyo, Japan). The sensors and cameras may comprise their own image processing software. The cameras are preferably positioned downstream of the individuals, facing the individuals, above the door, and in some embodiments, attached to the door or moving access structure itself.

With reference again to FIG. 2, step 110 states to detect person, and optionally other objects within the images. This step can be carried out by computer hardware 220 executing one or more software modules or engines 230. Examples of hardware includes processors 222 (e.g., CPU, GPU, or AIA), data storage 224, memory 226, and various image and graphics processing units 228.

A detection tracking and recognition engine or module 232 searches for faces and optionally other objects as the candidate walks towards the access control device or door. A wide range of face and object detection and tracking algorithms may be employed on the system 210 by the processor 220. Non-limiting examples of suitable face and object detection and tracking algorithms include: King, D. E. (2009). "Dlib-ml: A Machine Learning Toolkit" (PDF). J. Mach. Learn. Res. 10 (July): 1755-1758. CiteSeerX 10.1.1.156.3584 (the "dlib face detector"); and the JunshengFu/tracking-with-Extended-Kalman-Filter. The dlib face detector is stated to employ a Histogram of Oriented Gradients (HOG) feature combined with a linear classifier, an image pyramid, and sliding window detection scheme.

Figure 3:
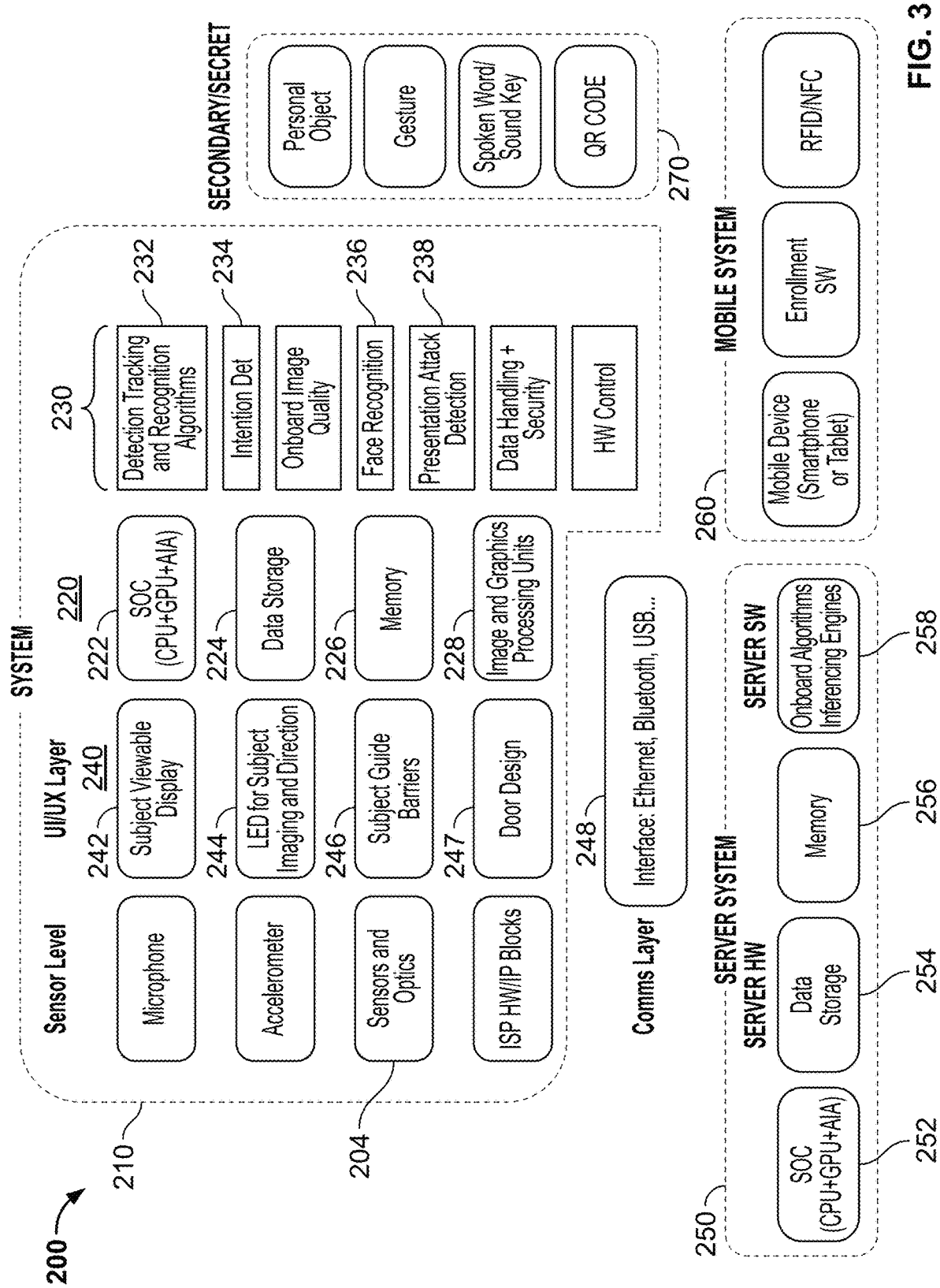
FIG. 3 is a block diagram of an access control system in accordance with an embodiment of the invention.

Additionally, a user interface or human factor layer 240 is shown in the system 210 of FIG. 3. In embodiments, a subject viewable display 242 assists in directing the person to the door, as well as to look towards the camera. Optionally, LED 244 such as a LED light ring surrounding the display is indicative of direction or visually changes based on position of the subject. As described further herein, other human factors can be included in the system including guide rails 246 and virtual or augmented reality type graphics to assist in guiding the candidate to look in the direction of the cameras, and ultimately to the door access device 247.

No Person Detected

In the event a face or human is not detected at step 110 (e.g., candidate falls or otherwise drops out of the FOV) or the image fails to pass a minimum quality threshold, the method proceeds to step 160. The state is set to 'idle'.

Step 160 states to determine whether a tracking ID exists for the candidate. If a tracking ID does not exist (e.g., the candidate is new), the process simply proceeds to step 154. The state of the system remains at 'scan', and the live stream of images (step 102) is interrogated for a person.

If, at step 160, a tracking ID exists for the candidate (e.g., the candidate was being tracked but has fallen or leaned over to pick up a belonging), then the method proceeds to step 150. In embodiments, step 150 stops the current tracking ID, and resets the timer. Following resetting the tracking ID and timer, the state is set to 'scan' and the live stream of images (step 102) is interrogated for a human or face having a minimum level of quality.

Person Detected

In the event a human is detected and passes the minimum quality threshold at step 110, the system assesses the instant state of the system (step 112) for determining the current state and which phase to perform, namely, intention detect 122, face recognition 124 or presentation attack detection 130.

In the event the state is set at 'person detected', the method proceeds to step 114 to commence face and/or body tracking, assign tracking ID, and to commence the timer.

The method then proceeds to step 120 and assigns the system state to intention detection.

Step 122 is intention detection. As described herein, in connection with FIGS. 4-5, step 122 determines a level of intent the subject presents to unlock the door lock based on the body motion of the subject. This step may be performed by an intention detection module 234 on the system 210, as described further herein. If the level of intent is deemed insufficient, the method returns to step 140 and the state counters for number of images and time is updated.

Example counter states, as discussed herein, include the number of frames idle, number of frames same person detected, number of frames intention detection, and number of frames face recognition.

Output from the state counter 140 is interrogated at step 106 for whether the process should be (a) restarted for a new candidate, or (b) continued for the same candidate. As described further herein, thresholds for determining whether to continue or restart can be based on time elapsed, the number of images submitted, candidate is outside the field of view, etc. In preferred embodiments, the process is restarted if the total time elapsed is greater or equal to 10 seconds, more preferably 5 seconds, and in embodiments, 3 seconds. In another preferred embodiment, the process is restarted if 30 frames have been submitted.

If it is determined to restart the process for a new candidate, step 150 stops the current tracking ID, resets the timer, and sets the state to 'scan'. After the tracking ID and timer have been reset, the process proceeds to step 154 for scanning, and the face tracking is commenced according to the steps described above.

In contrast, if the level of intent is deemed adequate at step 122, the method proceeds to step 124 to update the system state to face recognition detection.

Step 126 states face recognition. As described further herein with reference to FIG. 6, this step determines a level of confidence the subject is a match with an authorized individual based on evaluating biometric information (e.g., the face) of the subject and the authorized individual. This step may be performed by an face recognition module 236 on the system 210. Exemplary algorithms for image matching include, for example, the Algorithms evaluated by the National Institute of Standards and Technology (NIST) Face Recognition Vendor Test (FRVT) and headquartered in Gaithersburg, Maryland. If the level of confidence is deemed insufficient, the method returns to step 140. The state counters for number of images and time is updated accordingly, and the method proceeds as described above.

If the level of confidence is deemed adequate at step 126, the method proceeds to step 130 to update the state to real person detection, namely, presentation attack detection (PAD).

Step 130 states real person detection. This step computes a level of authenticity of the subject. As described further herein in connection with FIGS. 7 and 8, this step determines a level of authenticity that the person is a real person. It is based on emitting multiple wavelengths of light towards the face of the subject, and detecting reflectance/absorption of the multiple wavelengths. This step may be performed by a presentation attack detect engine 238 using data from the sensors and optics 204 on the system 210.

If the level of authenticity is deemed insufficient, the method returns to step 140. The state counters for number of images and time is updated accordingly, and the method proceeds as described above.

If the level of authenticity is deemed adequate at step 132, the method proceeds to step 180 to open/unlock. This step activates the access control device 247 based on, collectively, the level of intent, the level of confidence, and the presentation attack screening.

Optionally, and with reference to step 142, other conditional logic may be applied to determine whether to open/unlock the access control device 247 such as but not limited the use of time elapsed, number of frame images, etc.

Intention Detection

Figure 4:
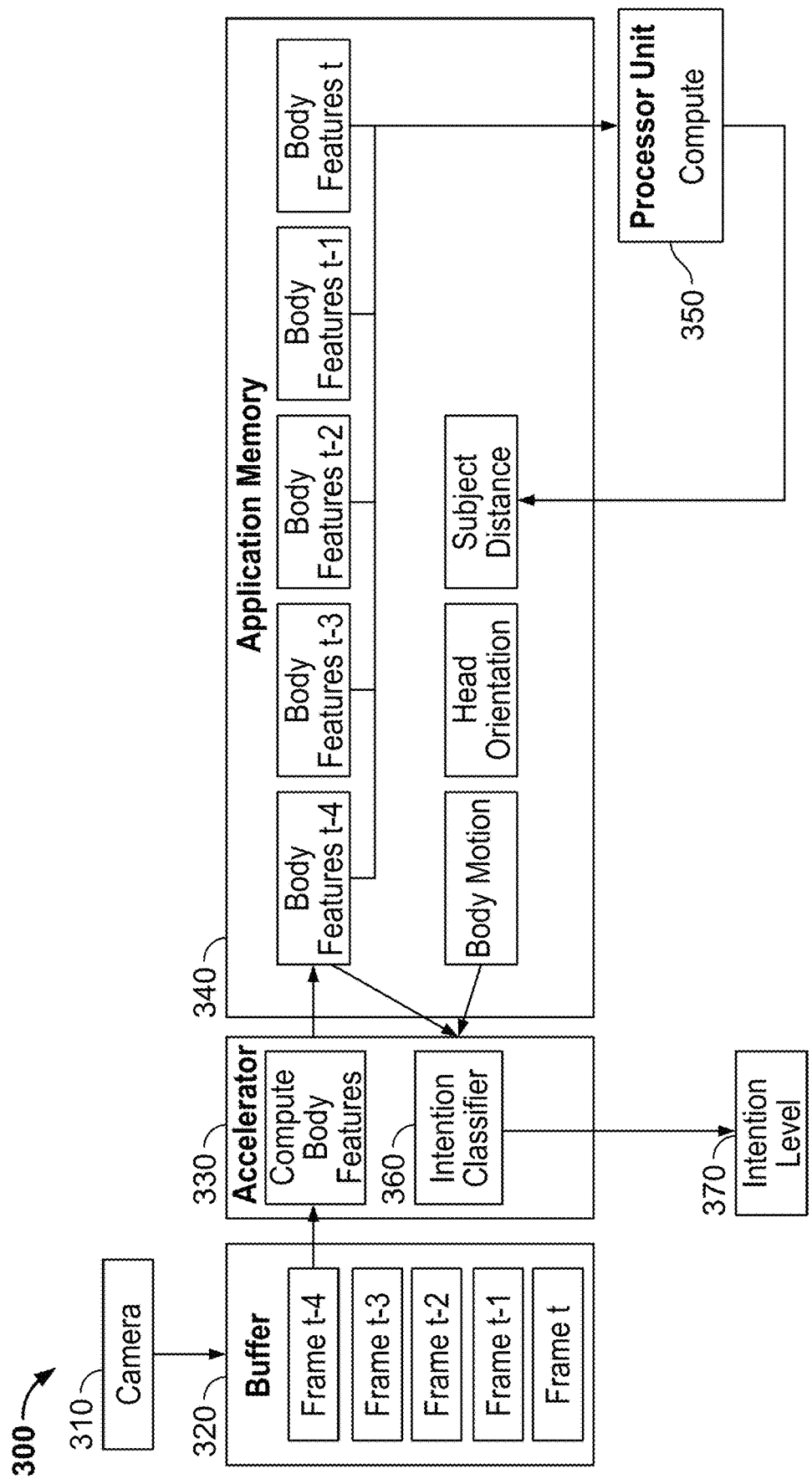
FIG. 4 is a flow chart illustrating an overview of an intention detection process in accordance with an embodiment of the invention.

FIG. 4 details an intention detection system in accordance with an embodiment of the invention. Initially, several image frames from camera 310 are obtained and placed in buffer 320. Examples of cameras, include without limitation, Leopard Imaging CMOS camera, model number LI-USB30-AR023ZWDRB (Freemont, California). Data from a depth sensor may also be obtained and used or fed into the intention classifier, discussed herein. Examples of depth sensors include brand RealSense Depth Camera D435i or L515, manufactured by Intel Corporation (Santa Clara, California).

Body features are computed from the frames using processor 330, preferably an accelerator-type processor. In embodiments, a pretrained convolutional neural network is run on the processor and extracts the body features. Various types of neural networks may be employed as is known by those of skill in the art. An exemplary computing tool or algorithm for computing the body features from the image frames is PoseNet V2.0. See, e.g., M. Andriluka, L. Pishchulin, P. Gehler, and B. Schiele. 2d human pose estimation: New benchmark and state of the art analysis. In CVPR, 2014. Body features can include, without limitation, shoulders, arms, legs, joints, eyes, ears, nose, etc.

The computed body features are sent to memory 340, and a central processor 350 or another processer is operable to compute various characteristics relating to the individual based on the body features including, without limitation, head orientation, distance to the subject, and body motion. The body features collected from the data set will then be used to create either a statistical binary intention classifier (e.g., SVM or random forest, etc.) or a more sophisticated transfer-learning based convolutional neural network classifier to infer the intent of the detected subject. We may also infer intent from a set of conditional logic based thresholds.

In embodiments, the threshold of the classifier is dynamically based and dependent on the number of subjects seen by the camera system. For example, an access control device placed in a high traffic area (e.g., cruise ship room near an elevator) will desirably have a more stringent, tighter threshold than one at the end of a long hallway that sees little traffic. In an embodiment, an initial default threshold for a classifier model is based on expected traffic flow. Then, the threshold for each door or access control point is adjusted based on the traffic flow actually observed by the system.

In embodiments, distance to the subject is computed by calibrating the face size with distance to the camera.

In embodiments, head orientation is computed based on identifying the face, features of the face, and applying a head orientation algorithm as is known to those of skill in the art. A non-limiting example of a suitable algorithm for determining head orientation is by A. Gee and R. Cipolla, "Estimating Gaze from a Single View of a Face," ICPR '94, 758-760, 1994.

In embodiments, body motion is computed based on tracking particular body features across multiple consecutive frames. In a preferred embodiment, the following body features are tracked across the multiple frames: shoulders, arms, nose, legs, eyes and ears.

An intention classifier 360, preferably run on a processor framework including one or more processors, determines an intention level that the individual desires to unlock/open the door based on one or more of the above mentioned computed characteristics (head orientation, distance to the subject, and body motion) and the computed body features.

In embodiments, an intention classifier is built and trained using a transfer-learning model-building tool such as, for example, Tensorflow. See, e.g., Abadi et al., TensorFlow: A system for large-scale machine learning, 12th USENIX Symposium on Operating Systems Design and Implementation (OSDI 16), USENIX Association (2016), pp. 265-283 and a number of carefully designed and collected image sets.

In embodiments, the image sets are generated by passing a large number of subjects through a hallway having four doors. Subjects passed by some doors and opened (and entered) others. Cameras on all doors captured the event for each subject. Intension was recorded for subjects that opened and walked through the door. No intention was recorded for subjects that passed by the target door or opened other nearby doors. Using the body features from the two classes of data (Class1: subject opens door and Class2: subject does not open door), the intention classifier was specifically trained for intention with body features of subjects approaching and opening a specified door and with body features of subjects walking past a specific door. The transfer-learning based classifier provides an intention score for each image of a subject in the vicinity of a door. Once an image in the streaming sequence indicates positive intent, the intent stage is complete and the next stage is entered.

Figure 5:
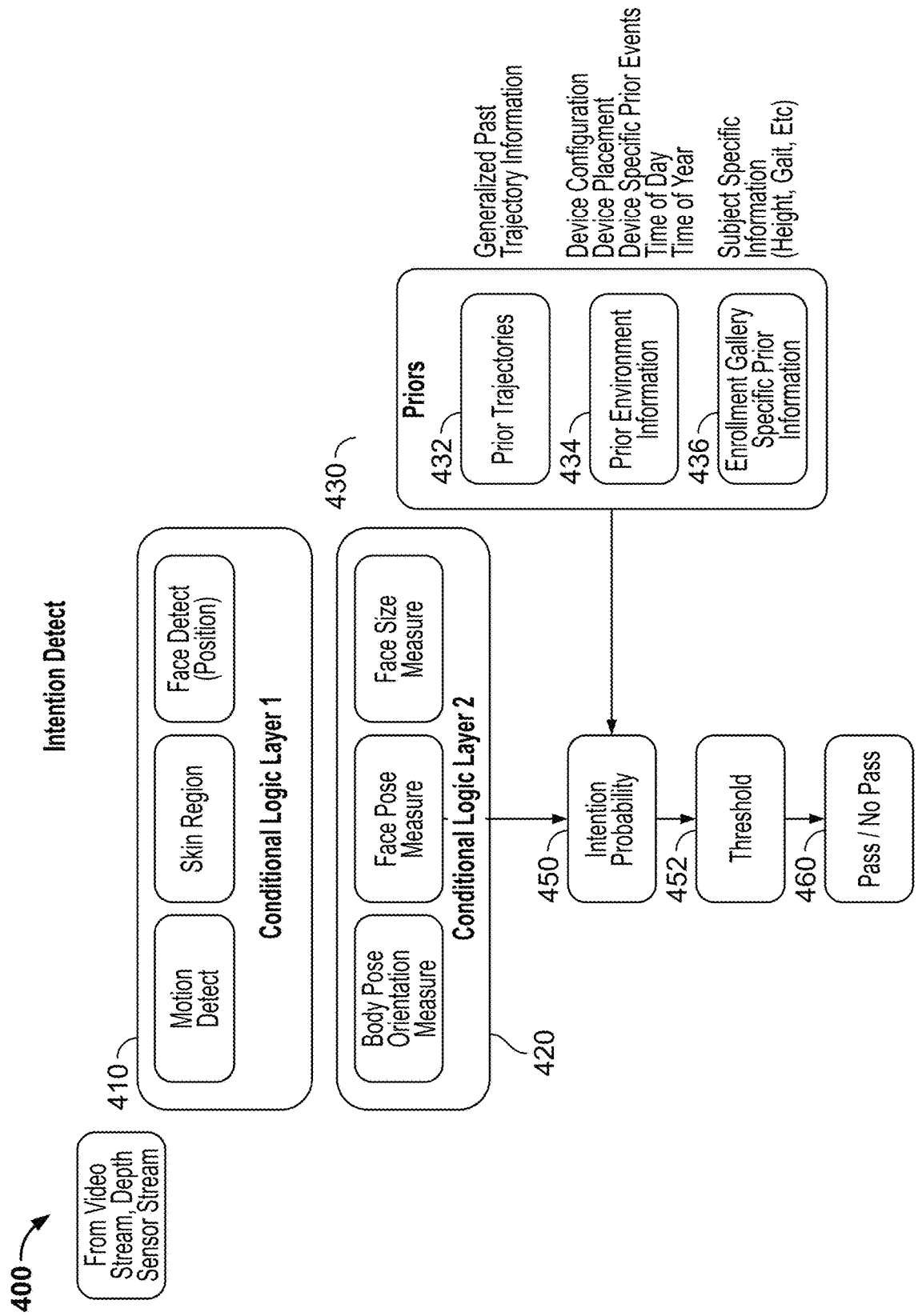
FIG. 5 is a flow chart illustrating an intention detection process in accordance with another embodiment of the invention.

With reference to FIG. 5, an intention detection process 400 in accordance with another embodiment is illustrated. Particularly, the process 400 includes a first conditional logic layer similar to that described in connection with FIG. 4 but additionally shows a second logic layer 420 that receives prior information to facilitate computation of an intention probability 450. The prior information may include a wide range of types of information including trajectories 432 (e.g., generalized past trajectory information), environment parameters 434 (e.g., device placement and configuration, device specific prior events, time of day, time of year, etc.), and the individual characteristics 436 (subject specific information such as, e.g., height, gait, etc.).

Step 452 compares a predetermined threshold to the computed intention probability. This step may be carried out on the central processor 350 described above.

Lastly, step 460 outputs whether the individual is computed to pass (namely, seeking to unlock/open the door) or not pass (namely, not seeking to unlock the door).

Face Recognition

Figure 6:
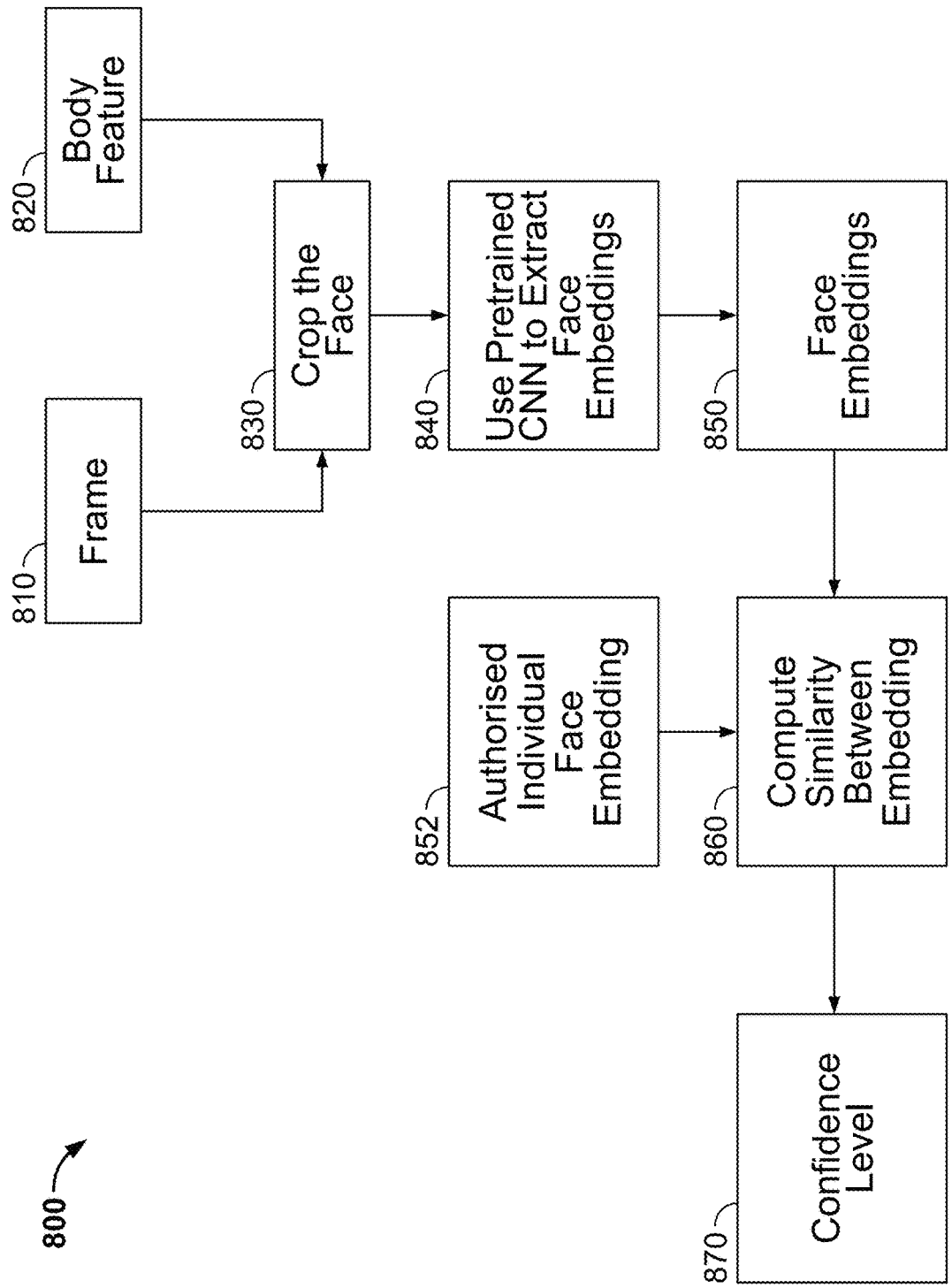
FIG. 6 is a flow chart illustrating a confidence level detection process that the individual's face matches an authenticated face in accordance with an embodiment of the invention.

FIG. 6 is a flow chart detailing a face matching process in accordance with an embodiment of the invention.

As described above, an initial step (step 810) states to obtain one or more frames of the individual approaching the access control device. Body features 820 are also computed and stored in memory as described above in connection with FIG. 4.

Step 830 states to crop the face of the individual within the frame(s).

Step 840 employs a pretrained CNN to extract face embeddings based on the face crop and the stored body features. This step may be performed on an accelerator processor.

Step 850 submits the extracted face embeddings for matching.

Step 860 computes a similarity between the extracted face embeddings and a pre-acquired (and validated) image of the person to be identified. This step may be performed on the CPU.

A confidence level is output (step 870). Exemplary outputs for the face match state can include: high confidence match, high confidence non-match and low confidence recognition.

The face matching phase may be performed using a face matching engine including a face classifier 236 on board the device 210. Machine learning algorithms and inferencing engines 258 can also be incorporated into the device 210 or a remote server 250 for increasing the accuracy and efficiency of the above described steps, particularly, for increasing the accuracy and efficiency of face detection and matching. A communication interface 248 is shown in FIG. 3 for sending the person's image to a remote server. The server processor(s) 254, data storage 254, and memory 256 are operable to rapidly determine whether the difference between the person's image and a pre-acquired stored image is acceptable to confirm the person's identity. Examples of suitable face matching software include, without limitation, the algorithms evaluated by the National Institute of Standards and Technology (NIST) Face Recognition Vendor Test (FRVT) headquartered in Gaithersburg, Maryland.

Presentation Attack Detection

Figure 7:
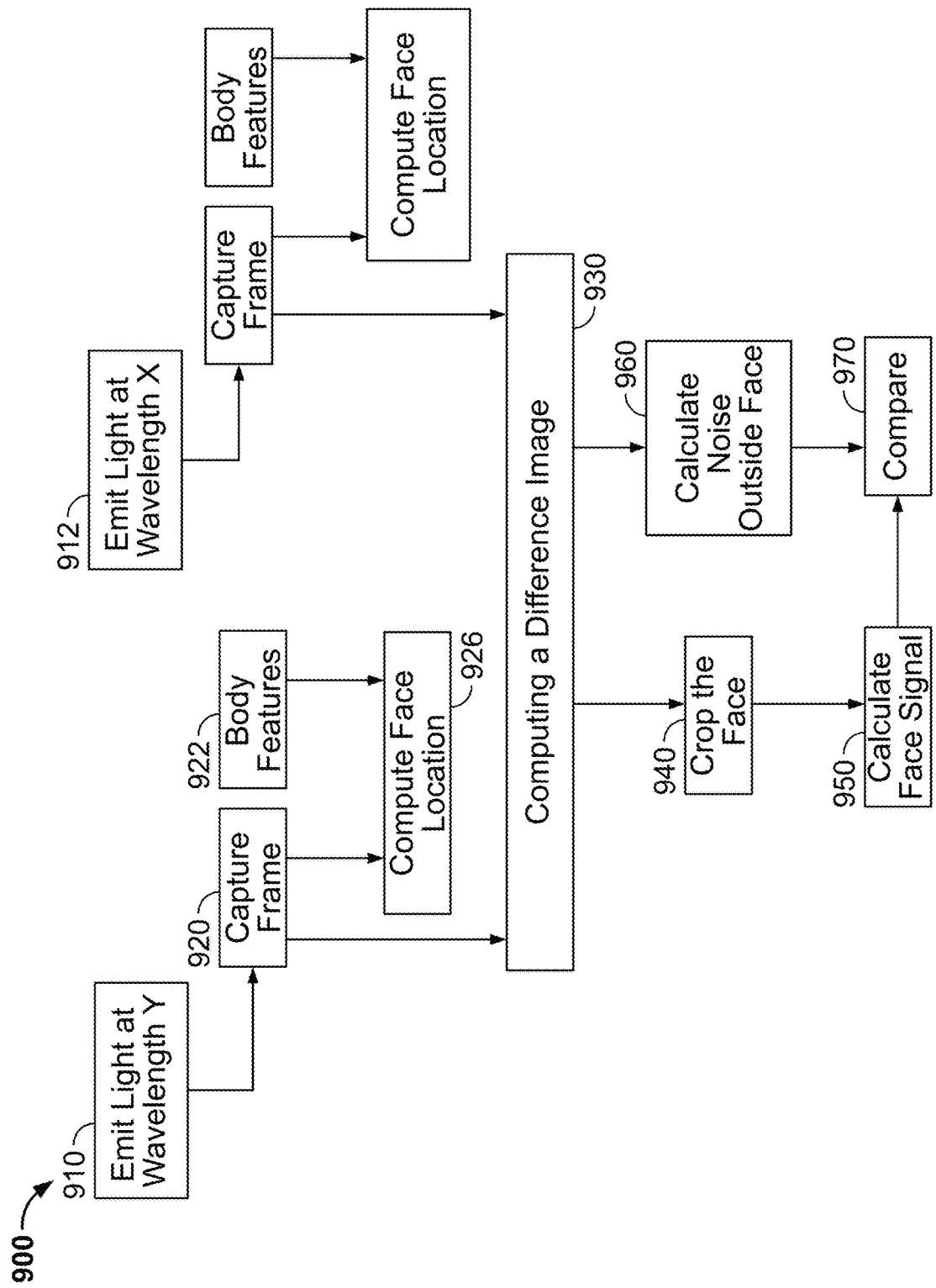
FIG. 7 is a flow chart illustrating a presentation attack detection (PAD) process for determining whether the presented biometric information from the individual is real in accordance with an embodiment of the invention.

FIG. 7 illustrates a presentation attack detection (PAD) process 900 for computing whether the presented biometric information from the individual is real in accordance with an embodiment of the invention. As described herein, the PAD is particularly useful to determine whether the skin on the face is real skin.

Figure 9:
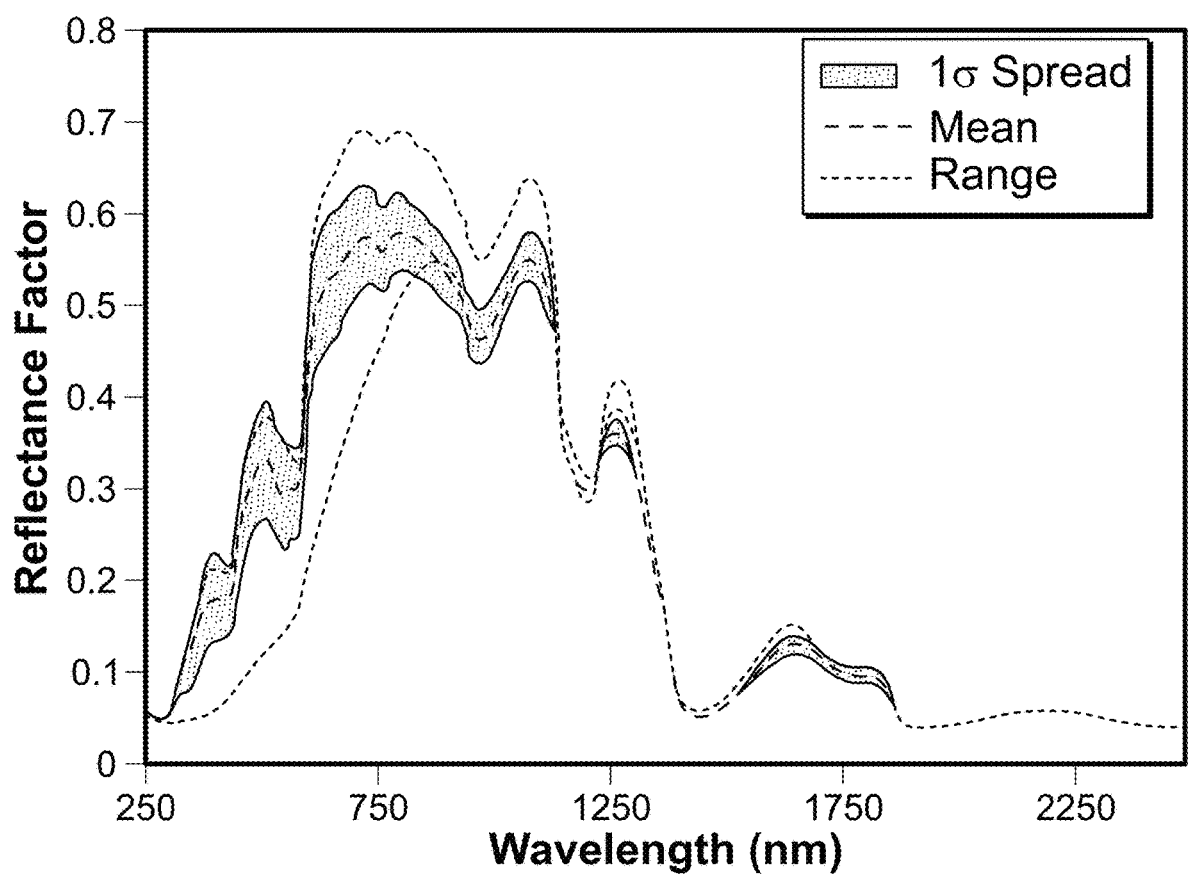
FIG. 9 is a chart illustrating skin light reflectance versus wavelength.

Without intending to being bound to theory, the specular reflections from skin oils combined with the morphological features of the human face provide unique image-based signatures. For example, and with reference to FIG. 9, reflectance is plotted versus wavelength for skin. The chart shows a clear and distinct dip in reflectance for the 900-1000 nm range. These signatures can be measured through simultaneous and/or non-simultaneous differential imaging formed by aligning, subtracting, and spatial filtering of images taken with different lighting/camera angles. As discussed further herein, in contrast, the reflectance signature for a mask or photo does not share these patterns and signs.

With reference again to FIG. 7, a first PAD process 900 is described. Steps 910 and 912 state to emit light towards the individual at two different wavelengths. In embodiments, the first wavelength is approximately 910 nm, and the second wavelength is approximately 970 nm. In embodiments, a first light source and second light source having a different wavelength range than the first light source is provided to direct light at the individual at different time periods, non-simultaneously. During the first period of time, the first light source is cony and the second light source is 'off'; and during the second period of time, the second light source is cony and the first light source is 'off'. However, it should be understood more or less light sources may be employed to carry out the invention. In another embodiment, for example, a single light source is adapted to non-simultaneously emit bursts of light having different wavelengths. An example of such a light source is very fast amplitude modulating VCSEL or LED illuminators.

Step 920 states to capture a frame for each of the two wavelengths of light. A camera sensor can capture an image frame for image processing on the computer.

Step 930 states to compute a difference image between the two images. The two images may be aligned, and one subtracted from the other to produce a difference image.

Step 940 states to crop the face in the difference image. Optionally, the face is cropped in the difference image.

Step 950 states to calculate a face signal. The computer is operable to compute a face signal level from the difference image.

Step 970 states to compare the face signal with a noise signal (step 960) corresponding to the region outside the face in the difference image. In the event the face is real, the face signal will be different from the noise signal. In the event the face is not real (e.g., a photo or mask), the face signal and noise signal will be the same. In embodiments, the signals are considered the same if the signals do not differ by more than a threshold value.

In embodiments, a metric (e.g., a level, rank, score, or another value) is computed by comparing how close the signals are to one another. If the metric is above a threshold value, the signals can be considered the same. An exemplary technique for signal comparison is to determine the cross correlation coefficient.

Exemplary output states from the PAD can include 'high confidence REAL', 'high confidence PAD', 'low confidence REAL' or 'low confidence PAD'.

If the system determines the face is real, and the other above described assessments are passed, the access control device is unlocked or opened.

Figure 8A:
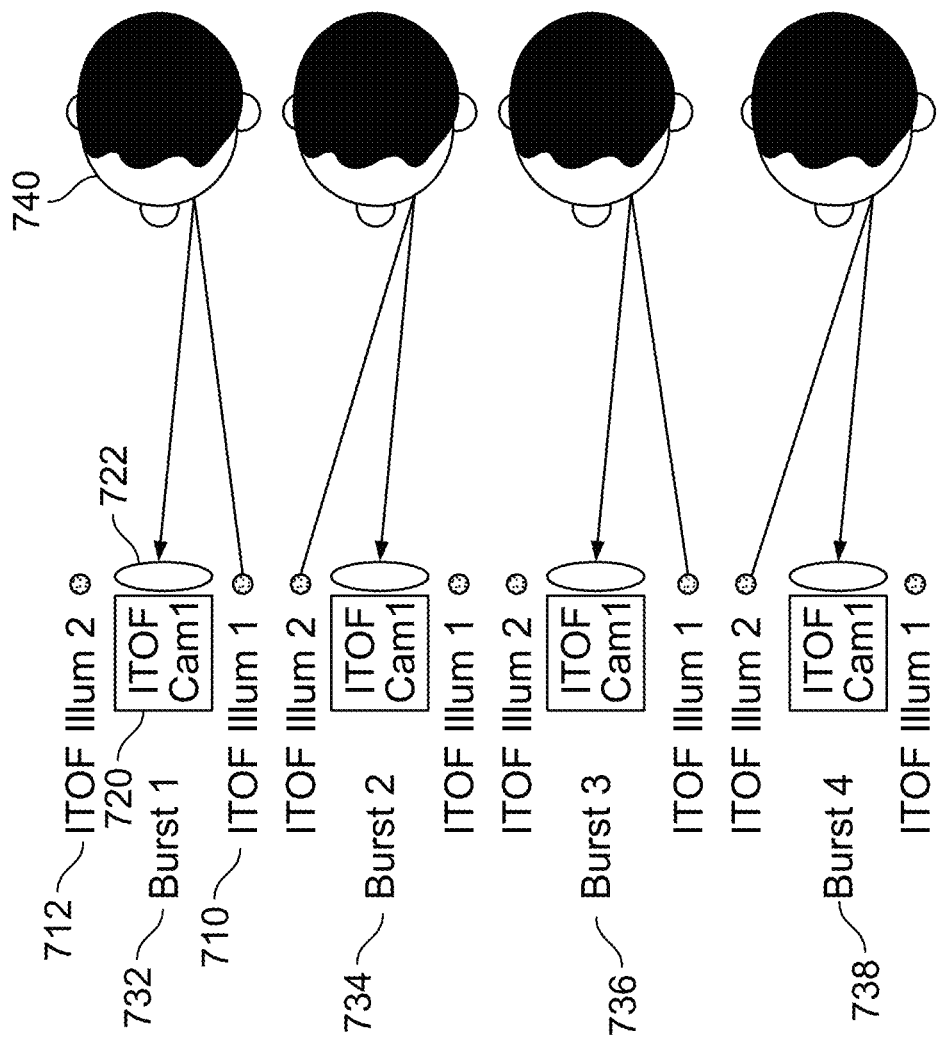
FIG. 8A is an illustration of a PAD process for determining whether the presented biometric information from the individual is real in accordance with an another embodiment of the invention.
Figure 8B:
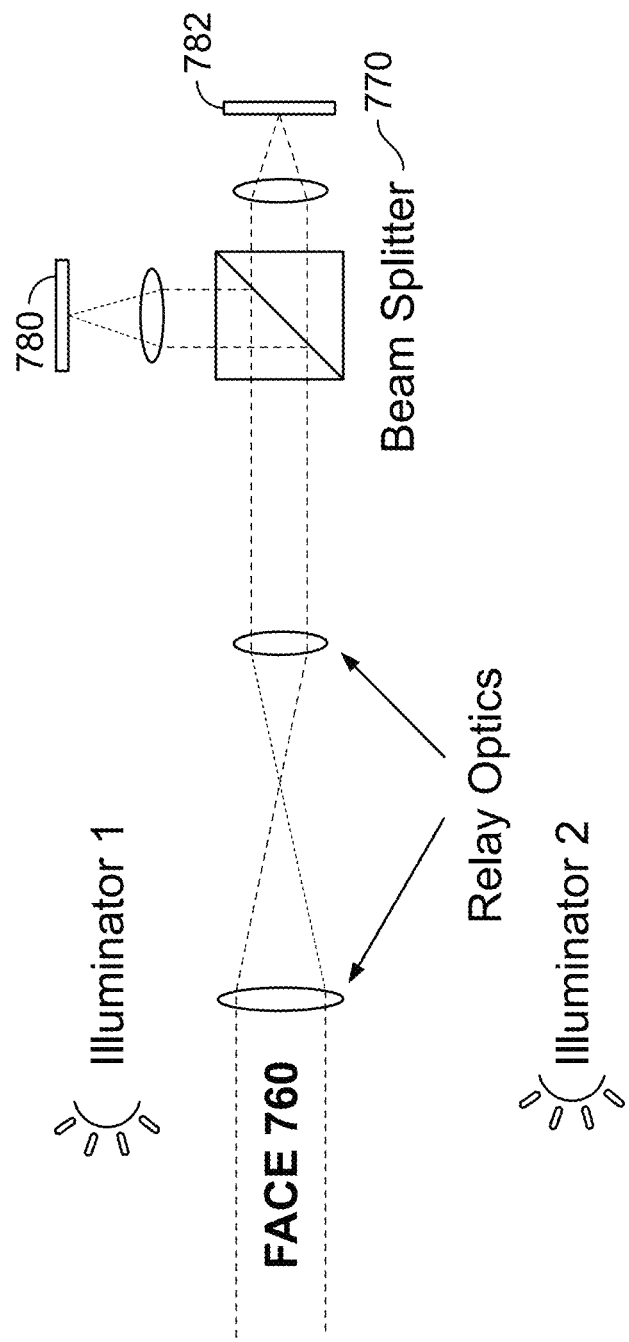
FIGS. 8B-8D are illustrations of various embodiments of the invention of a PAD system for determining whether the individual is real based on scattered light signatures.

FIG. 8A illustrates another PAD system comprising a plurality of bursts of illumination 732, 734, 736, 738 directed at a face 740 of the subject. The wavelengths are chosen to uniquely distinguish between human faces and the materials that would be used for presentation attack. Exemplary wavelengths for different illuminators 910 nm and 970 nm.

The illuminator device may consist of a spatial arrangement of very fast amplitude modulating VCSEL or LED illuminators 710, 712 emitting at one or more wavelengths at calibrated positions relative to one or more sensor arrays 720 and lens 722. These sensor arrays can be of the standard imaging type, using global or rolling shutter, or by incorporating indirect time of flight (ITOF) measurements in with specialized sensors frequency locked with a fast amplitude modulated light source. An example of a sensor array is IMX287, manufactured by Sony Corporation. (Tokyo, Japan).

With reference again to FIG. 8A, multiple bursts of light at two different wavelengths (732, 734, 736, and 738) are directed at the face 740 of the person. Reflectance and depth from indirect time of flight sensors are measured.

The information from depth, differential spectral imaging, and differential directional lighting imaging are used to form features that have a high degree of uniqueness which can be applied against a threshold value to indicate the skin is real.

For example, a normalized measurement of reflectance of a real face at 910 nm would indicate a sharp decrease or change in slope due to water absorption. In contrast, a measurement of reflectance of a polymer (e.g., PET) mask for the same wavelength range would show a much different slope, namely, no slope. In embodiments, the computer processor is programmed and operable to compare the two reflectance signatures and classify whether the presenting face is real based on the reflectance signature as described above.

In embodiments, depth/angle information of the face arising from the reflected light is also used to compute a more unique signature of a real face vs. a personation attack. In embodiments, two 3D unit vectors are computed in the same coordinate system: 1) eye gaze vector and 2) face direction vector. The inner product of these two unit vectors (the cosine of the angle between the two vectors) will be constant between image frames for non-human targets approaching the camera. For live human face images, the inner product will tend to be variable between frames. Conditional logic may be used to distinguish between these two inner product signals. This feature may be used to distinguish live human targets from non-human or non-live human targets (e.g., printed face image or face image on a tablet or phone display). This inner product can be computed for each eye to accommodate subjects with artificial eyes.

Polarization

In embodiments, scattering properties of light reflected off the face are measured to generate a light scattering signature. Skin and skin oils affect the angle of reflected light and intensity. By measuring polarized light reflected off the skin, a real face scattering signature can be generated and compared to a fake face scattering signature.

In embodiments, a classifier is trained on two sets of light scattering signatures including a first set of real faces, and a second set of fake faces or spoofs. The trained classifier is operable to output whether the candidate signature is representative of a real face or a fake face.

The design of the system may vary widely. In embodiments, and with reference to FIG. 8B, light reflected from the face (760) is measured through a Stokes imaging system or polarimeter. Examples of components in a Stokes imaging system or polarimeter include, without limitation, polarizers, modulators, and analyzers. See, e.g., Jing Guo, Deqing Ren, Yongtian Zhu, Xi Zhang, A high-speed and high-efficiency imaging polarimeter based on ferroelectric liquid crystal retarders: Design and test, Publications of the Astronomical Society of Japan, Volume 73, Issue 2, April 2021, Pages 405-416, https://doi.org/10.1093/pasj/psab007.

Light reflected from the face is sent through the polarizing beam splitter (770) and sensed by cameras (780, 782) to obtain a scattering signature.

Figure 8C:
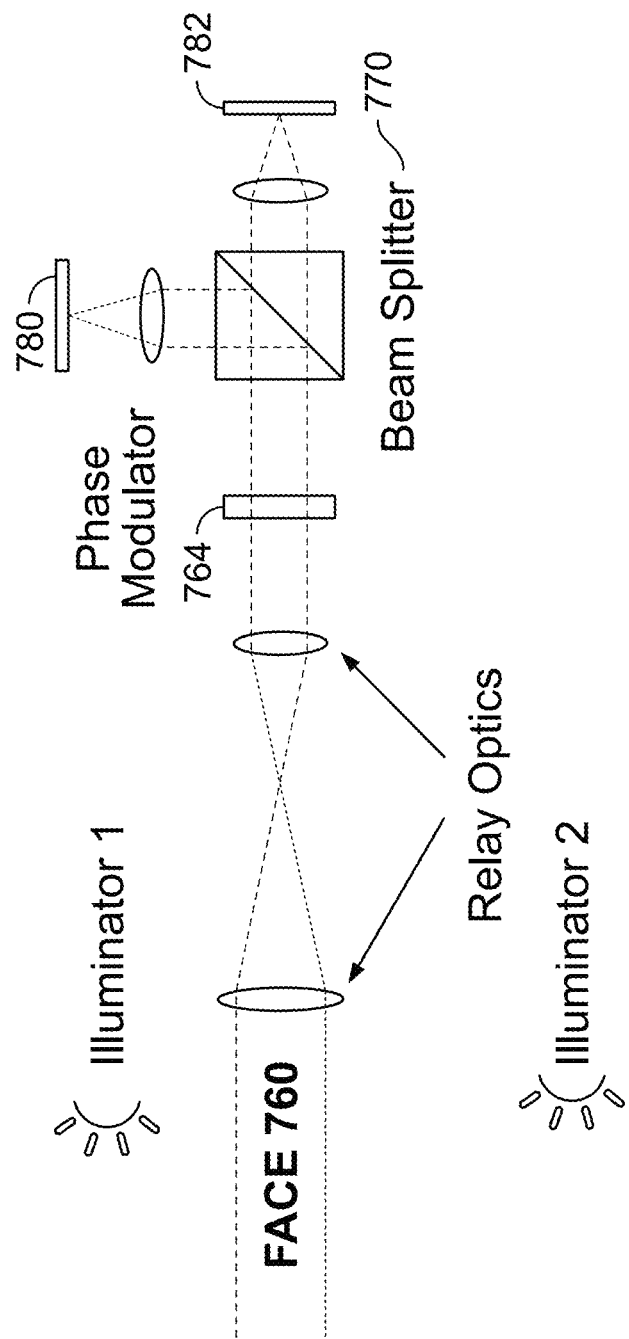

Optionally, and with reference to FIG. 8C, the light is modulated by a phase modulator 764 for reducing noise. Without being bound to theory, phase modulation provides faster calibration of sensor and optical noise sources through normalized (un-normalized) differencing of the e and o rays, thereby enhancing the signal.

Figure 8D:
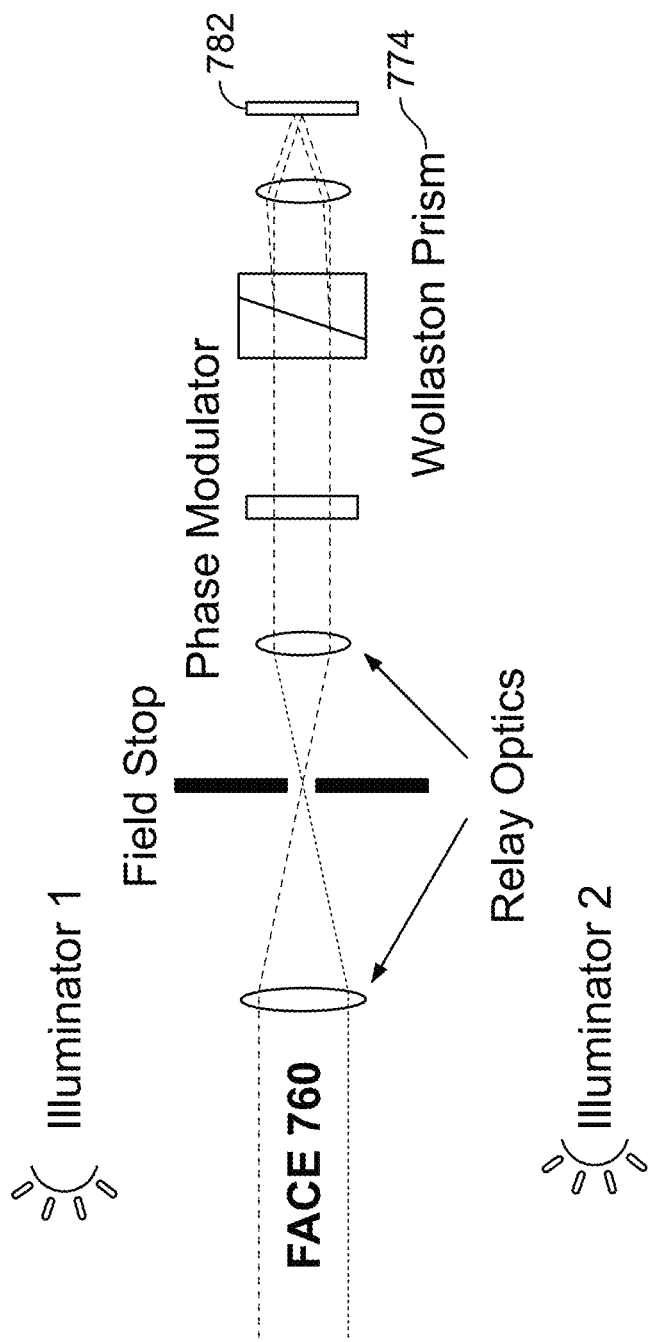

In yet another embodiment, and with reference to FIG. 8D, the light is shown being sent through a Wollaston prism 774 where the images are offset and are recorded by camera 780. The Wollaston prism PAD design shown in FIG. 8D enables detection of two images using only one camera 782. This embodiment also shows a phase modulator similar to that described in FIG. 8C.

Optionally, one or more active light sources or illuminators are arranged to direct light at a right angle to the face for improved scattering properties. Intensity may also be recorded for the detected light. A trained classifier can determine whether the presented face is real based on the polarization information recorded by the polarimeter. Such information may include the polarization state of light, namely, the Stokes parameters.

In embodiments, depth and imaging information may also be collected and supplement the polarization information. For example, an indirect time of flight (ITOF) sensor including an illuminator in the near IR obtains depth and imaging information from the individual. The processor may be further programmed and operable to determine a metric whether the individual is a real human based on the additional depth and imaging information from the ITOF sensor. Preferably, the near IR illuminator is a power calibrated illuminator, and more preferably, the depth and image information is absolute skin reflectance information.

In other embodiments, the system is operable to determine a metric whether the individual is a real human based on the depth and imaging information from a ITOF sensor, and the use of other types of information in the query is optional. Without intending to being bound to theory, the depth and imaging information can reflect real face profiles because the real face has anticipated change in depth relative to landmarks. In contrast, a 2D presentation attack using an image on a tablet, photo, or paper shall lack the natural anticipated face depth profiles. In embodiments, the PAD system includes a trained deep-learning model (such as a trained CNN) to determine whether the face is real based on the above mentioned information or features. A suitable PAD classifier and model is built and trained using a number of custom-prepared image sets. The image sets were prepared by having subjects passing through the doors described above with their image displayed on a tablet and on a printed piece of paper or cardstock. Two classes are defined: real face and fake face. These two classes of images are then used as input to a transfer learning based binary classifier constructed from a sophisticated pre-trained model (e.g., See Szegedy et al., Rethinking the Inception Architecture for Computer Vision, arxiv.org/pdf/1512.00567v3 [cs.CV].) The pre-trained deep convolutional base model combined with our two classes defined from the data sets above are used to generate and fine-tune our new unique PAD classifier.

High Confidence Real was recorded for real faces passing through the door. High Confidence Presentation Attack was recorded for paper and tablet-based images.

Ultimately, if the system determines the face is real, and the other above described assessments are passed, a command or instruction is created for an action to be carried out. In embodiments, the command or instruction causes the access control device to be unlocked or opened. However, as stated herein, the command or instruction may serve to provide other or additional actions such as, e.g., permitting execution of a financial transaction.

Figure 10:
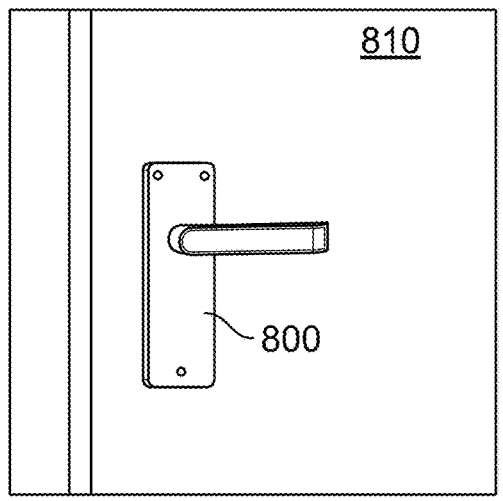
FIG. 10 is an illustration of an electro-mechanical door access control device in accordance with an embodiment of the invention.

The access control device design may vary. FIG. 10 shows an electrically controlled door lock 800 installed in a door 810 in accordance with an embodiment of the invention. When an enrolled face for a particular door is found to be real with the intent to open the door, the computer system (not shown) will send a signal, for example, over Wiegand, OSDP or GPIO (general purpose input and output) to the door lock 800 to unlock the door so that the individual may open the door. Examples of electric door locks that may be incorporated into the handle structure include without limitation the Series 45/44 electric locks manufactured by ZKTeco USA (Fairfield, New Jersey).

Thermal-Based PAD

A. Evaluate Thermal Face Features

Figure 11A:
FIGS. 11A, 11B are thermal images of a real human face and dummy face respectively.
Figure 11B:
Figure 12A:
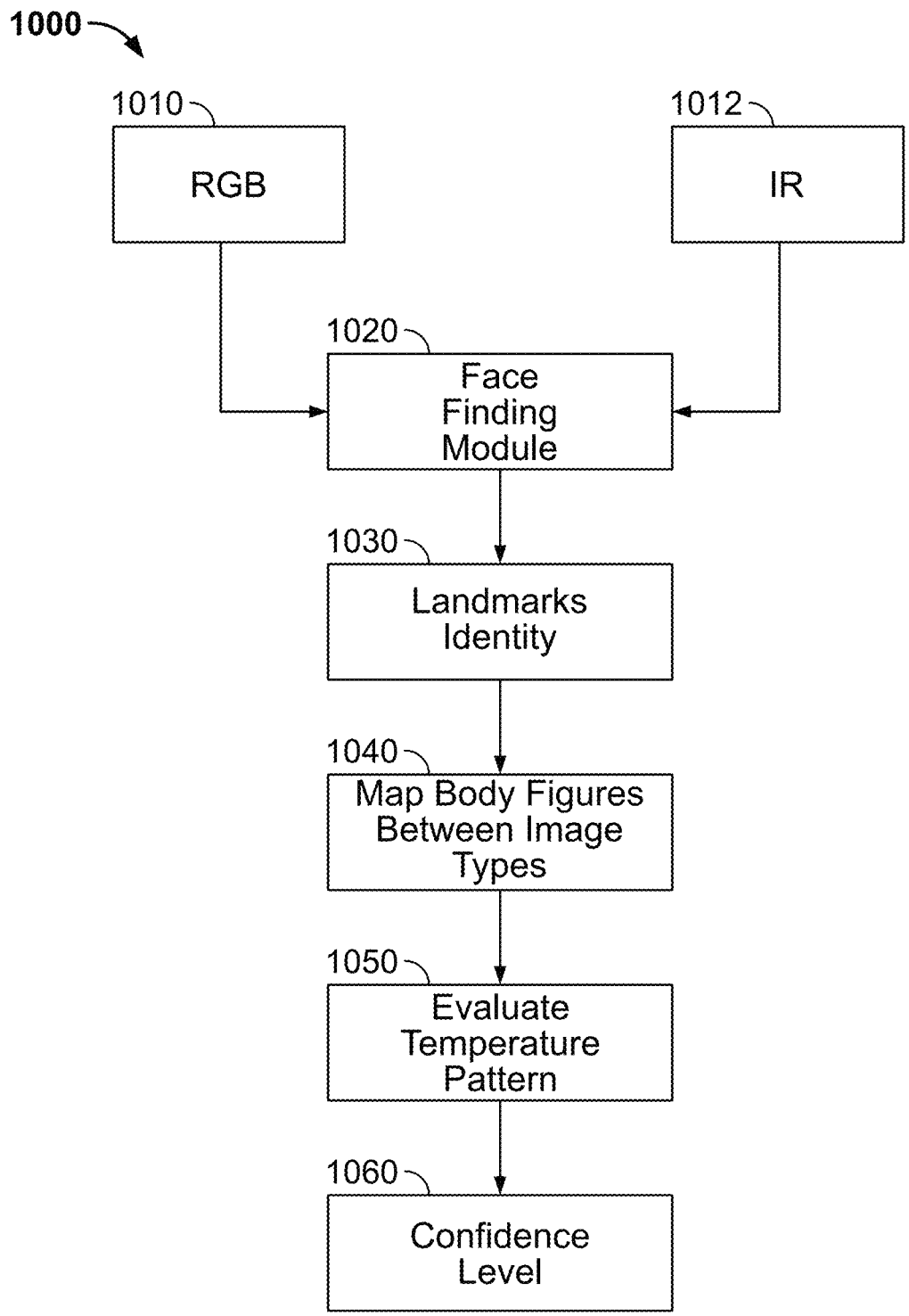
FIG. 12A is a flow chart illustrating a presentation attack detection process based on thermal image data in accordance with an embodiment of the invention.

FIG. 12A is a flowchart of another PAD process 1000 in which thermal patterns of the face are evaluated. With reference to FIG. 11A, which is a thermal image of a real human face, certain thermal patterns are indicative of a real face because the face has consistent relatively hot and cold landmarks such as the eyes and nose, respectively. The temperature profile of a real face would thus be markedly different than that of a presentation attack using, e.g., a photograph, tablet, prosthetic or dummy mask such as that shown in FIG. 11B.

With reference again to FIG. 12A, the method 1000 initially obtains one or more frames of the individual approaching the access control device (step 1010,1012). This step may be carried out using one or more sensors and cameras. In embodiments, RGB (1010) and IR (1012) sensors are used to obtain RGB and thermal images, respectively. An exemplary IR camera is made by Infrared Cameras Inc., the ICI 8640 S-Series infrared cameras (Beaumont, Texas). Optionally, depth sensors are employed to obtain depth image data. The RGB and depth sensors may be the same as those described above in connection with, e.g., FIGS. 4-6.

Next, a face finding algorithm is employed to identify the face (1020). The face finding algorithm may operate on either the thermal image data, RGB image data, or both. In a preferred embodiment, the face finder module operates on the RGB image.

Next, face landmarks are identified and stored in memory (step 1030). The face landmarks or, more generally, body features may be obtained from the images using a trained classifier. Non-limiting examples of body features include head, eyes, nose, etc.

Step 1040 states to map/register one or more features of the thermal image with that of the RGB image. In embodiments, the eyes and or eyepoints are mapped from the RGB image to the thermal image. In a preferred embodiment, the mapped landmarks include one or both canthi of each eye. An example technique for performing this step is described in, e.g., Richard Hartley and Andrew Zisserman (2003). Multiple View Geometry in computer vision. Cambridge University Press. ISBN 0-521-54051-8. In embodiments, mapped landmarks can include anatomical features that are not covered by eyewear such as the nose. Optionally, the entire face of the thermal image is mapped with the RGB image.

Step 1050 states evaluate temperature pattern of the face based on the mapped thermal image. In embodiments, a temperature is computed in the neighborhood of selected features (e.g., the eyes and nose) in the thermal image. For example, the average eye temperature and an average nose temperature are both computed, and the difference or ratio between the two features is computed.

Evaluation is then performed by comparing the temperature difference or ratio to a threshold value. If the computed value is greater than the threshold value, a confidence level of real is assigned to the face. If the computed temperature difference is less than a threshold value, then a confidence level of PAD, fake or spoof is assigned to the face. In embodiments, the threshold value for the temperature ranges from 95 to 105 degrees F., and the threshold value for the temperature difference ranges, for example, from 1-10, or perhaps 4-8 degrees F.

In another embodiment, a trained classifier automatically evaluates whether the presenting face is real or fake based on the mapped thermal image. In embodiments, the classifier is trained by creating two datasets: 1) real thermal face images (from actual humans) and 2) fake thermal face images (from screen images or photo prints of face images). These two classes of images are then used as input to a learning based binary classifier constructed from a pre-trained model (e.g., see Szegedy et al., Rethinking the Inception Architecture for Computer Vision, arxiv.org/pdf/1512.00567v3 [cs.CV]). The pre-trained deep convolutional based model combined with our two classes defined from the datasets above are used to generate and fine-tune this PAD classifier to correctly identify the spoof or fake face. Step 1060 states confidence level. A confidence level is output based on above described evaluating step. Examples of output may include fake, spoof, PAD, or real.

The above described steps may be performed on a CPU or other processing framework. An exemplary process and system for determining temperature of a body feature such as the eyes is described in Provisional Patent Application No. 63/087,743, filed Oct. 5, 2020, entitled "VISIBLE AND FAR INFRARED CAMERA IMAGING SCHEME FOR DETECTING ELEVATED BODY TEMPERATURE," and an exemplary process and system for calibrating the camera(s) is described in Provisional Patent Application No. 63/087,725, filed Oct. 5, 2020, entitled "CALIBRATION TARGET FOR VISIBLE LIGHT AND FAR INFRARED CAMERAS AND RELATED METHODS," each of which is herein incorporated by reference in its entirety.

B. Human/Real Skin Classifier

Figure 12B:
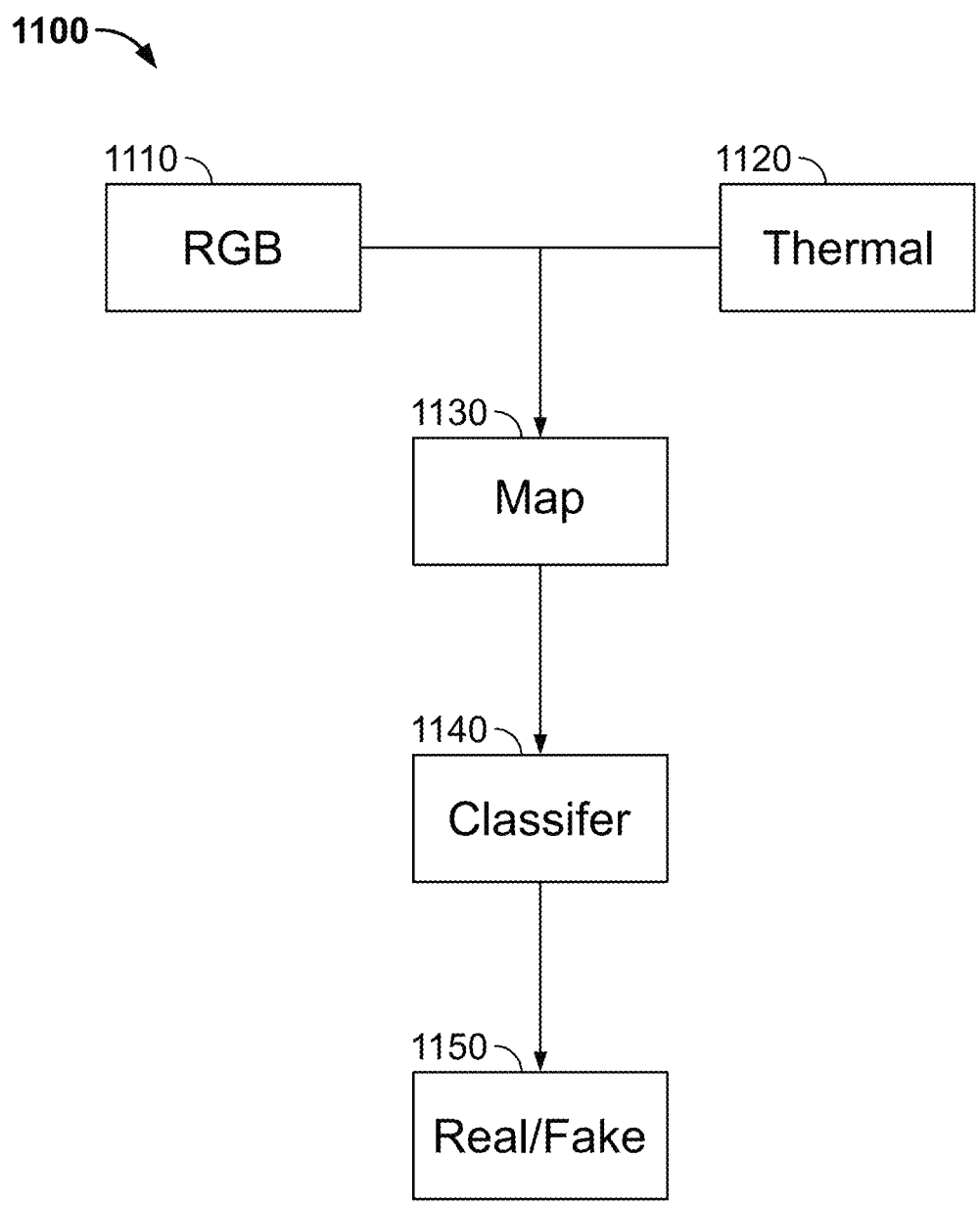
FIG. 12B is a flow chart illustrating a presentation attack detection process based on thermal image data in accordance with another embodiment of the invention.

FIG. 12B is a flowchart of another process for PAD based on thermal image data.

Steps 1110 and 1120 refer to obtaining RGB and IR image data respectively of the candidate individual. Cameras and sensors as described herein may be used for this step.

Step 1130 states to map, namely, map the RGB and IR image data to one another. Particularly, as described herein, a table is generated in which each pixel includes a color value from the RGB camera and corresponding thermal value from the IR camera. The cameras may be calibrated for mapping the thermal and RGB values by pixel as is known in the art, or as described in Provisional Patent Application No. 63/087,725, filed Oct. 5, 2020, entitled "CALIBRATION TARGET FOR VISIBLE LIGHT AND FAR INFRARED CAMERAS AND RELATED METHODS," the entirety of which is incorporated herein by reference.

Figure 16:
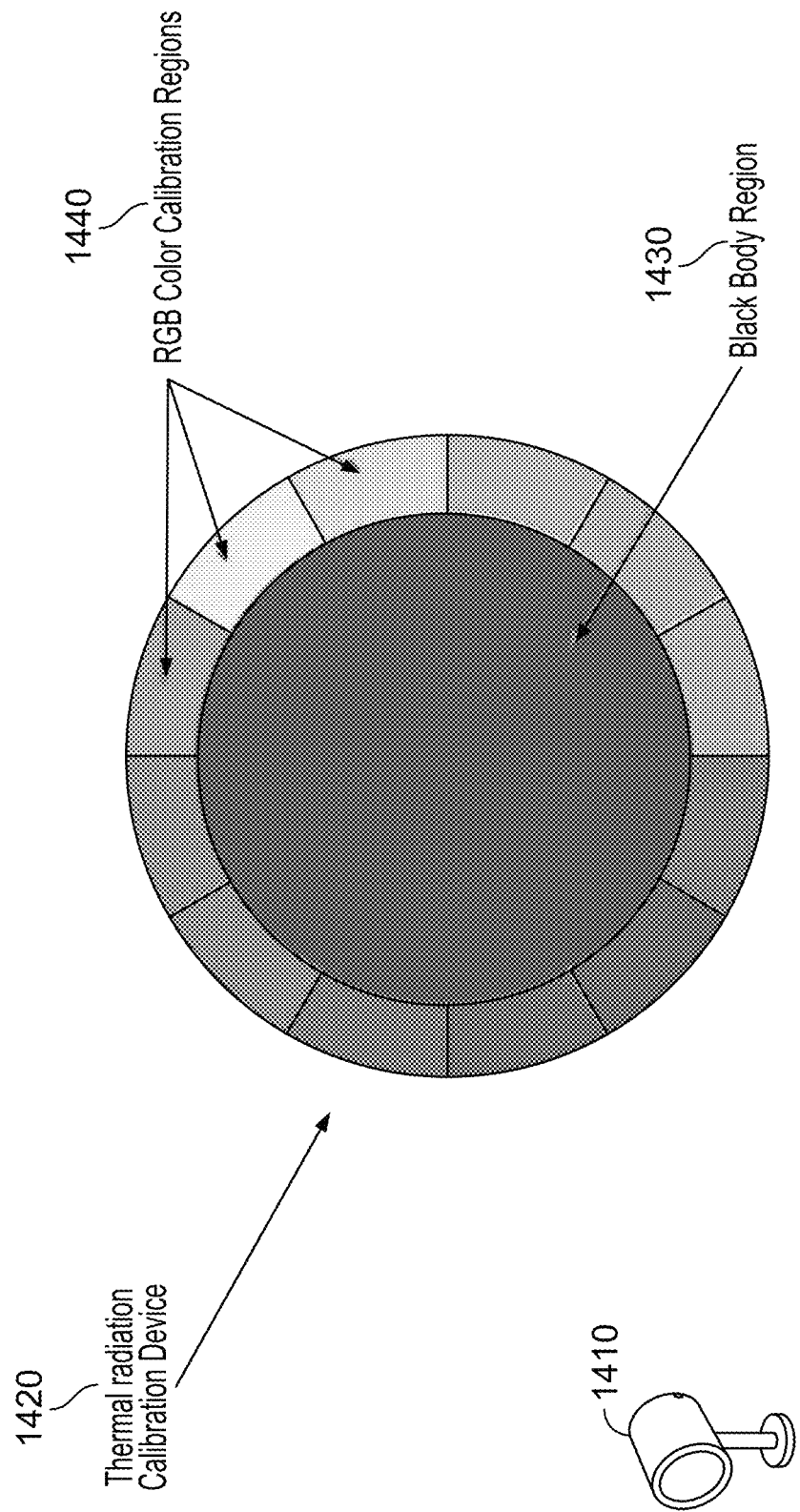
FIG. 16 is an illustration of a novel calibration device.

In embodiments, and with reference to FIG. 16, the camera(s) 1410 may be calibrated based on a custom calibration apparatus 1420. In embodiments, calibration may be performed when installed, or more preferably at the time of manufacturing. Calibration apparatus 1420 is shown having a circular shape including a black body source area 1430 and a plurality of color regions 1440. The black body source area 1430 and color regions 1440 are concentrically arranged showing a plurality of discrete color regions (e.g., red, yellow, blue, green, etc.) along the outer circumferential area. The black body source area is in the center.

In embodiments, calibration can be performed in real-time with facial landmarks found in both images. The camera matrix parameters can be solved using a set of image pairs (namely, the facial landmarks from each image) from the two cameras. In the case of the checkerboard calibration technique, described herein, the corner points of the checkerboard are used for calibration. In a real-time technique, instead of using the checkerboard corners of each image, one can use the facial landmarks in each image.

The black body source area acts as a thermal calibration source for the IR camera and the color regions are used for calibrating the RGB cameras. Preferably the colors of color regions 1440 match tones of the skin. The thermal and RGB cameras may be calibrated with the novel apparatus 1420 as is known in the art.

The correlated data is input directly into a classifier (step 1140). The classifier is programmed to classify real human skin based on (a) the measured color being within the color range for human skin tone (b) the measured temperature being within the normal range for humans, and (c) the number of pixels where both (a) and (b) are true.

However, in embodiments, the classifier may be a more sophisticated deep learning or machine learning model trained on a data set of real and fake faces (e.g., photo or tablet image). An exemplary classifier is a trained CNN.

Step 1150 shows the output from the classifier. Particularly, in embodiments, step 1150 outputs whether the candidate face is real or fake. Notably, this embodiment does not require face or feature detection, serving to save computing resources and increase the speed of the PAD. Indeed, a low resolution thermal sensor, inexpensive RGB photodiode, and programmed CPU could be arranged as a small kit/device operable to correlate the thermal and color data as described above for determining whether a real human is present. Such a device or kit can be incorporated into a wide range of things including, without limitation, appliances, access systems, alarm systems, tools, and vehicles (namely, the IOT).

In embodiments, a hierarchical system initially detects the presence of a human as described above, and if a real human is present, the image data is further interrogated by the computing system for face detection and face matching. In embodiments, if the presented individual is matched or authenticated, access is granted or, as the case may be, the appliance is activated. Using a hierarchical approach saves computing resources when the presented image is not a human, or a fake.

In embodiments, a non-transitory program storage device, readable by a processor, comprises instructions stored thereon to cause one or more processors to detect the presence of a human and whether the human is real based on the thermal and visible light image data, as described herein. In embodiments, the storage device is a storage device of a smartphone, tablet, laptop, or portable computing unit. In embodiments, cameras are integrated into the body or housing with the storage device, and processors. In one embodiment, a smartphone includes the thermal camera, RGB camera, processor and storage adapted to detect the presence of a real human versus PAD. In embodiments, a software application (namely, an App) includes a set of instructions to cause one or more processors to detect the presence of a real human versus PAD. The App may be downloaded from a remote server to each individual's device.

C. Face Makeup Disguise Detection

Figure 13:
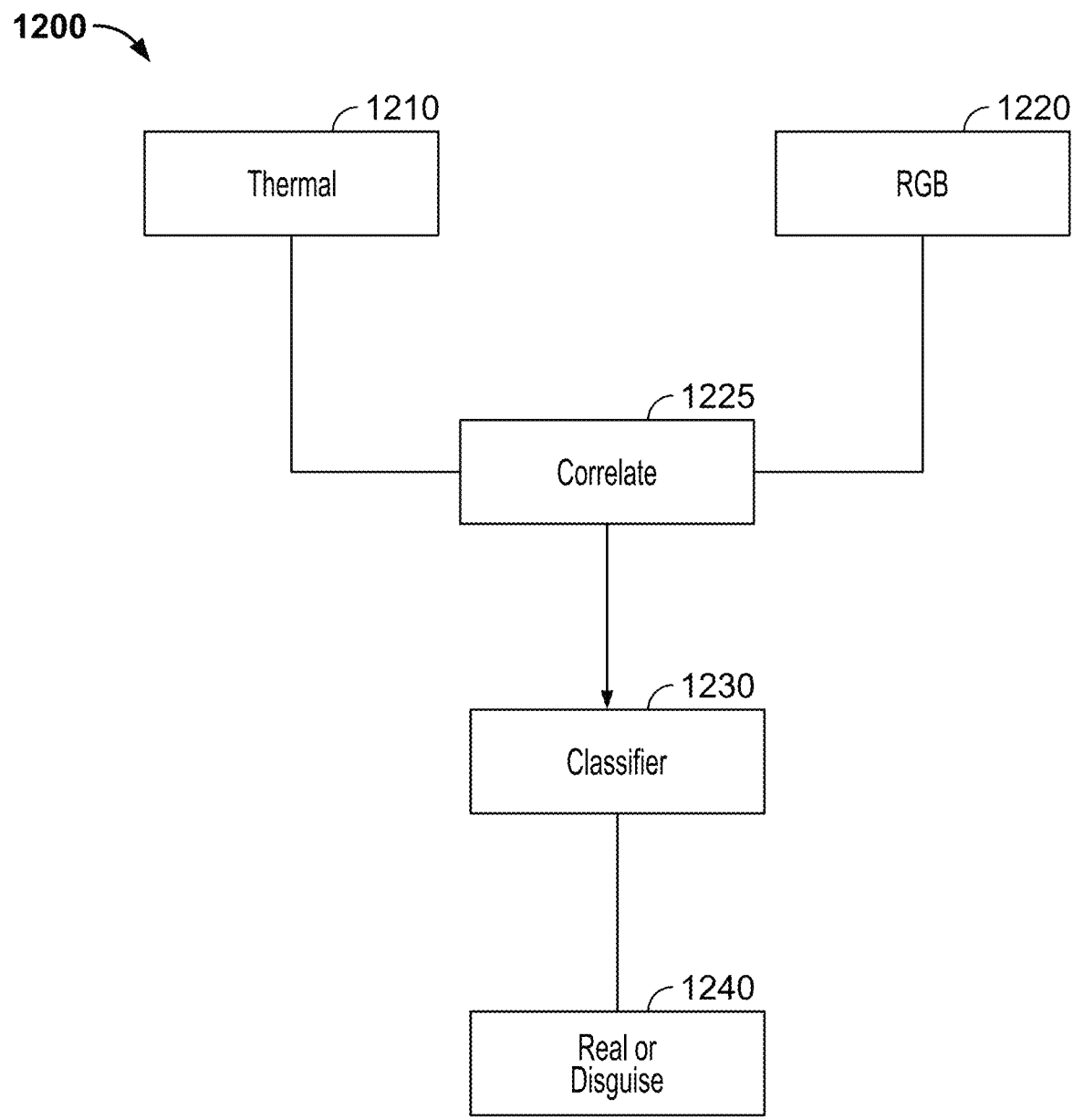
FIG. 13 is a flow chart illustrating a presentation attack detection process based on thermal image data in accordance with another embodiment of the invention.

Embodiments of the invention can also detect presentation attacks arising from face makeup. With reference to FIG. 13, in embodiments, temperature and emissivity values of the face are evaluated using IR cameras 1210 and a trained classifier 1230 to determine whether a makeup-disguised face is being presented.

It is well known that emissivity is the ratio of how well an object radiates heat, compared to a perfect radiator. Emissivity values fall between 0 and 1 An object that measures 1 is considered a perfect radiator and is called a "black body." An object that reflects all energy such as a theoretically perfect mirror would have a value of 0.

Emissivity varies by surface condition, viewing angle, temperature and spectral wavelength. Human skin is close to a perfect radiator with an emissivity of 0.98. In contrast, a polished copper surface is at the other end of the spectrum with a value of 0.01.

The emissivity of makeup-covered skin is lower than that of skin, and consequently, an IR sensor shall observe a lower temperature for makeup-covered skin than the raw skin despite the actual temperature of the different surfaces being about the same. This is because the raw skin has a higher emissivity than the makeup covered skin.

Most infrared cameras have the ability to change the emissivity setting, so if the emissivity value of the material being inspected is known, the camera can be adjusted to obtain a measured temperature closer to the actual surface temperature. To this end, in embodiments, the IR camera could be calibrated for skin or makeup. Additionally, dedicated makeup and skin-calibrated IR cameras could be employed to observe the actual temperature of the different target surfaces.

With reference again to FIG. 13, in embodiments, additional sensors capture RGB image data 1220 and optionally, depth image data, of the individual. The image data from the different sensor types may be mapped by pixel to generate a correlated data set 1225. Calibration of the IR and RGB sensors may be performed as described above.

Figure 14A:
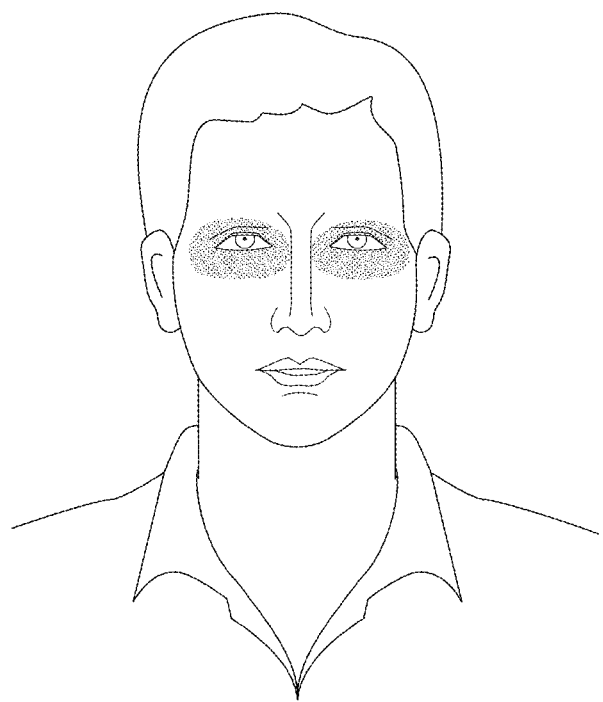
FIGS. 14A, 14B are illustrations of a presentation attack using makeup and eyeglasses respectively.

The correlated data is fed into a classifier to determine whether the presented face is a makeup disguise. The classifier can be trained to recognize patterns or signatures of raw skin (no makeup or normal makeup) versus unusual, uneven (namely, disguising) makeup. For example, as shown in FIG. 14A, an uneven makeup is applied to distort the location of the eyes, which could thwart face recognition algorithms that have not been trained on recognizing disguising makeup.

Figure 14B:

The classifier can also be trained to recognize patterns or signatures of raw skin versus eye glasses. For example, with reference to FIG. 14B, a thermal image is shown of a real face in which the eyes are covered with eye glasses. In accordance with embodiments described herein, a classifier is operable to recognize the disguising makeup (or eye glass-covered face es as the case) and can distinguish the presentation attack from a real face.

Finally, step 1240 shows the output from the classifier. Particularly, in embodiments, step 1240 outputs whether the candidate face is makeup disguised.

D. On-Axis/Common Axis Aperture

In embodiments, as described above, the IR and RGB cameras are aimed at the individual and must be calibrated to map the features found in the RGB to that of thermal image. When the cameras have different viewpoints, despite calibrating distortion and other parameters, some error can still remain in the transformation.

However, in embodiments, the viewpoint of each camera is arranged on the same axis.

Figure 15:
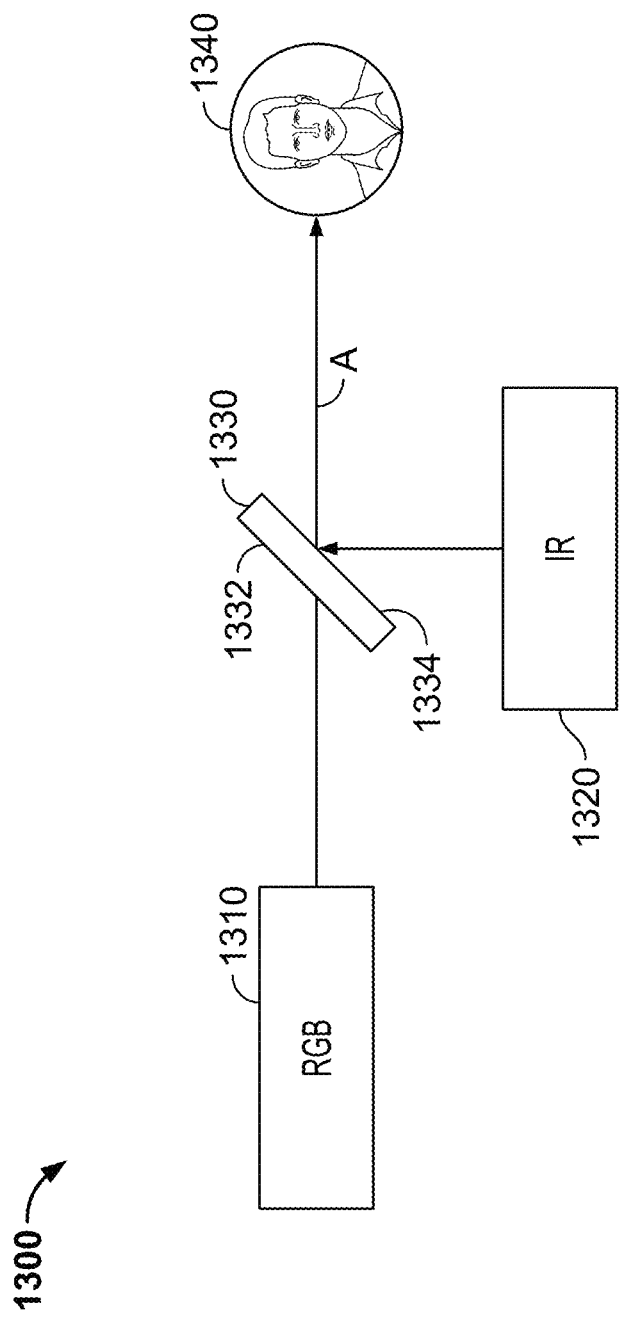
FIG. 15 is an illustration of on-axis or common-axis PAD system in accordance with an embodiment of the invention.

An example of an on-axis or common axis aperture system (1300) is shown in FIG. 15. RGB camera (1310) and IR camera (1320) are shown aimed/directed at the front and back surfaces, respectively, of optical substrate (1330). The optical substrate (1330) is selected to allow light having a wavelength in the visible spectrum to pass through and to reflect light in the far infrared wavelength range. Consequently, when the cameras and optical substrate are arranged as shown in FIG. 15, light from the face (1340) travels along axis (A) and passes through the optical substrate towards RGB camera (1310) and is reflected towards IR camera (1320).

Examples of an optical substrate for use in connection with the invention include, without limitation, glass, coated glass.

In another embodiment, an IR transmissive substrate/optically reflective substrate may be used as described above except the light in the far infrared wavelength range passes through to the IR camera, and the light in the visible spectrum range is reflected to the RGB camera. An exemplary optical substrate is Techspec Germanium (GE) window, Edmund Optics (Barrington, NJ USA).

It is also to be understood that the number of cameras and mirrors and arrangement of same may vary widely. A wide range of configurations may manipulate light from multiple sensor cameras to a common axis aimed at the face of the individual.

In another embodiment, and with reference again to FIG. 15, the optical substrate is insertable and retractable. In embodiments, the optical substrate need not allow any light to pass through. The optical substrate may be a mirror which reflects all light. Consequently, when the optical substrate is retracted, light from face (1340) travels directly along axis (A) towards the RGB sensor (1310).

When the optical substrate is inserted into the position as shown in FIG. 15, and the IR camera is activated, light from the face travels along the common axis (A) and is reflected off one side of the substrate towards the IR sensor (1320).

Alternative Embodiments

In embodiments of the invention, enrollment, entry, or ingress of confirmed individuals may be monitored by a census or population type state of system module. The system counts the number of people unlocking/opening the door and entering the designated area; optionally maintains an image of each person entering the designated area; and maintains the person's ID, and more preferably, an anonymized ID of each person entering the designated area. The system further monitors whether a person has left the designated area such that at any time, the system tracks the total number of people in the designated area. The designated areas may be located in various types of rooms, cabins, facilities, stations, or vehicles including, without limitation, cruise ships, trains, buses, subways, arenas, airports, office buildings, and schools.

The type of door or barrier may vary widely. The invention is applicable to a wide variety of barriers including swinging or sliding type doors, as well as turnstile, baffle gate, as well as tollbooth or train crossing type bars. Additionally, in the environments where a controlled opening or ingress lacks a solid barrier, and instead controls access by an alarm or light, the access control device may be mounted adjacent the opening to obtain the images of the person and carry out the computation steps described above. If the assessment(s) are passed, the access control device sends a signal to activate the audio, alarm, or light to permit entry.

The configuration or type of access control device may vary widely. Non limiting examples of access control devices include door locks; actuators/motors for automatic sliding door(s); and electronic locks for chests, cabinets, cash registers, safes, and vaults.

Although a number of embodiments have been disclosed above, it is to be understood that other modifications and variations can be made to the disclosed embodiments without departing from the subject invention.

The invention claimed is:

1. A presentation attack detection system for detecting a presentation attack or spoof of an individual presenting a face, the system comprising:
   an RGB camera;
   a thermal imaging camera;
   at least one processor operable to:
      acquire an RGB image of the individual from the RGB camera and acquire a thermal image of the individual from the thermal imaging camera; and
      determine a metric whether the individual is a real human based on data from the thermal image and RGB image
   wherein the RGB and thermal imaging cameras are arranged with an optical substrate to provide a common aperture axis; and
   wherein the optical substrate allows light having a wavelength in a visible spectrum range to pass through an entrance window of the RGB camera with thermal wavelengths reflecting to the thermal imaging camera.

2. The system of claim 1, further comprising a calibration apparatus adapted to provide a thermal black body source for the at least one thermal imaging camera and a plurality of colors for the at least one RGB camera to improve an accuracy of skin detection.

3. The system of claim 1, wherein the system is operable to simultaneously acquire the RGB and thermal images from the RGB and thermal imaging cameras.

4. The system of claim 1, wherein the at least one processor is operable to correlate the RGB image to the thermal image.

5. The system of claim 4, wherein the at least one processor includes a trained classifier to determine the metric based on the correlated images.

6. The system of claim 4, wherein the at least one processor is operable to detect a presence of eye glasses based on the correlated images.

7. The system of claim 4, wherein the at least one processor is operable to detect a use of makeup based on the correlated images.

8. The system of claim 4, wherein the at least one processor is operable to detect a presence of perspiration based on the correlated images.

9. The system of claim 1, wherein the at least one processor is operable to find the face based on the RGB image.

10. The system of claim 9, wherein the at least one processor is operable to identify landmarks of the face in the RGB image.

11. The system of claim 10, wherein the at least one processor is operable to correlate the landmarks of the RGB image to the thermal image.

12. The system of claim 11, wherein the at least one processor is operable to evaluate the correlated landmarks for at least one of spatial varying IR patterns, temporal varying IR patterns, or calibrated IR patterns indicative of a real face.

13. The system of claim 12, wherein the correlated landmarks comprise a medial or inner canthus of each eye.

14. The system of claim 1, wherein the at least one processor is operable to determine emissivity values from the thermal image.

15. The system of claim 14, wherein the at least one processor is operable to correlate the emissivity values to the RGB image.

16. The system of claim 15, wherein the at least one processor includes a trained classifier to determine the metric based on the correlated emissivity values.

17. The system of claim 1, wherein the optical substrate reflects light having a wavelength in a far infrared range.

18. The system of claim 17, wherein the optical substrate is retractable.

19. The system of claim 1, wherein the at least one processor is operable to recognize a real human from a presentation attack comprising at least one of paper, video, make-up, a 3D mask, a 3D model, or a prosthetic.

20. The system of claim 1, wherein the at least one processor is further operable to provide an instruction for a slave device to perform an action based on the metric.

21. The system of claim 20, wherein the slave device is at least one of a physical or logical access device, point of sale device, lock, e-lock, enrollment device, person validation device, or biometric identity device.

22. A system for detecting a presentation attack or spoof of an individual presenting a face, the system comprising:
a light source aimed at the face;
a polarimeter operable to generate polarization information of light reflected from the face; and
at least one processor operable to determine a metric whether the individual is a real human based on the polarization information from the polarimeter.

23. The system of claim 22, wherein the at least one processor is programmed with a trained classifier to detect whether the face is real based on the polarization information from the polarimeter.

24. The system of claim 22, wherein the polarization information comprises polarization intensity information.

25. A presentation attack detection system for detecting a presentation attack or spoof of an individual presenting a face, the system comprising:
at least one indirect time of flight (ITOF) sensor comprising a first illuminator and a second illuminator in the near IR for obtaining depth and imaging information from the individual, wherein the wavelength of light of the first illuminator is different than the wavelength of light of the second illuminator;
at least one processor operable to determine a metric whether the individual is a real human based on the depth and imaging information from the at least one ITOF sensor.

26. The system of claim 25, wherein the at least one illuminator is a power calibrated illuminator.

27. The system of claim 26, wherein the depth and image information is absolute skin reflectance information.

28. The system of claim 25, further comprising a polarimeter operable to generate polarization information of the light reflected from the face; and wherein the at least one processor is further operable to determine whether the individual is a real human based on polarization information in combination with the depth and imaging information.

* * * * *